US009024526B1

(12) United States Patent
Wenzlaff et al.

(10) Patent No.: US 9,024,526 B1
(45) Date of Patent: May 5, 2015

(54) DETECTOR ELEMENT WITH ANTENNA

(75) Inventors: Robert P. Wenzlaff, Toledo, OH (US); Edwin F. Peters, Toledo, OH (US); Carol Ann Wedding, Toledo, OH (US); James D. Butcher, Toledo, OH (US)

(73) Assignee: Imaging Systems Technology, Inc., Toledo, OH (US)

(*) Notice: Subject to any disclaimer, the term of this patent is extended or adjusted under 35 U.S.C. 154(b) by 281 days.

(21) Appl. No.: 13/493,130

(22) Filed: Jun. 11, 2012

(51) Int. Cl.
*H01J 47/04* (2006.01)
*H01Q 1/44* (2006.01)
*G01T 1/205* (2006.01)

(52) U.S. Cl.
CPC ....................................... *H01Q 1/44* (2013.01)

(58) Field of Classification Search
USPC ................. 313/567, 573, 581, 582, 631, 634; 250/374–388
See application file for complete search history.

(56) References Cited

U.S. PATENT DOCUMENTS 3,258,316 A 6/1966 Tepper et al.
3,386,919 A 6/1968 Forrat
3,412,043 A 11/1968 Gilliand
3,528,809 A 9/1970 Farnand et al.
3,603,836 A 9/1971 Grier
3,607,169 A 9/1971 Coxe
3,623,907 A 11/1971 Watts
3,634,314 A 1/1972 Geusic et al.
3,701,184 A 10/1972 Grier
3,778,331 A 12/1973 Scharf
3,784,677 A 1/1974 Versteeg et al.
3,794,503 A 2/1974 Netting
3,796,777 A 3/1974 Netting
3,838,307 A 9/1974 Masi
3,848,248 A 11/1974 MacIntyre
3,888,957 A 6/1975 Netting
3,900,624 A 8/1975 Schare
3,958,151 A 5/1976 Yano et al.
3,975,194 A 8/1976 Farnand et al.
3,979,500 A 9/1976 Sheppard et al.
3,983,075 A 9/1976 Marshall et al.
3,998,618 A 12/1976 Kreick et al.
4,017,290 A 4/1977 Budrick et al.
4,021,253 A 5/1977 Budrick et al.
4,025,689 A 5/1977 Kobayashi et al.
4,030,963 A 6/1977 Gibson et al.
4,035,690 A 7/1977 Roeber
4,041,345 A 8/1977 Sahni
4,048,533 A 9/1977 Hinson et al.
4,081,712 A 3/1978 Bode et al.
4,133,854 A 1/1979 Hendricks et al.
4,201,692 A 5/1980 Christophorou et al.
4,211,738 A 7/1980 Genis
4,233,623 A 11/1980 Pavliscak
4,247,594 A 1/1981 Shea et al.
4,257,798 A 3/1981 Hendricks et al.
4,260,525 A 4/1981 Olsen et al.
4,303,061 A 12/1981 Torobin
4,303,431 A 12/1981 Torobin
4,303,432 A 12/1981 Torobin
(Continued)

*Primary Examiner* — Karabi Guharay
*Assistant Examiner* — Nathaniel Lee
(74) *Attorney, Agent, or Firm* — Donald K. Wedding

(57) ABSTRACT

A detector element with one or more attached antenna for the detection of high energy transmissions, including microwaves, lasers, electromagnetic signals, RF waves, radiation, and/or other transmissions emitted by a source including a weapon system. The element may also be used as a safety device to warn and alert personnel working around high energy devices of electromagnetic leaks.

19 Claims, 10 Drawing Sheets

(56) References Cited

U.S. PATENT DOCUMENTS 4,303,433 A 12/1981 Torobin
4,303,603 A 12/1981 Torobin
4,303,729 A 12/1981 Torobin
4,303,730 A 12/1981 Torobin
4,303,731 A 12/1981 Torobin
4,303,732 A 12/1981 Torobin
4,303,736 A 12/1981 Torobin
4,307,051 A 12/1981 Sargeant et al.
4,309,307 A 1/1982 Christophorou et al.
4,315,192 A 2/1982 Skwirut et al.
4,320,418 A 3/1982 Pavliscak
4,340,642 A 7/1982 Netting et al.
4,349,456 A 9/1982 Sowman
4,363,646 A 12/1982 Torobin
4,415,512 A 11/1983 Torobin
4,445,050 A * 4/1984 Marks .......................... 307/145
4,481,421 A 11/1984 Young et al.
4,525,314 A 6/1985 Torobin
4,548,196 A 10/1985 Torobin
4,549,109 A 10/1985 Nighan et al.
4,552,607 A 11/1985 Frey
4,553,062 A 11/1985 Ballon et al.
4,568,389 A 2/1986 Torobin
4,569,821 A 2/1986 Duperray et al.
4,582,534 A 4/1986 Torobin
4,637,990 A 1/1987 Torobin
4,670,339 A 6/1987 Frey
4,671,909 A 6/1987 Torobin
4,703,229 A 10/1987 Nighan et al.
4,720,432 A 1/1988 VanSlyke et al.
4,743,545 A 5/1988 Torobin
4,750,081 A 6/1988 Zhang
4,769,292 A 9/1988 Tang et al.
4,775,598 A 10/1988 Jaeckel
4,777,154 A 10/1988 Torobin
4,789,783 A * 12/1988 Cook ........................... 250/379
4,793,980 A 12/1988 Torobin
4,803,096 A 2/1989 Kuhn et al.
4,827,186 A 5/1989 Knauer et al.
4,877,646 A 10/1989 Kuhn et al.
4,880,570 A 11/1989 Sanborn et al.
4,917,857 A 4/1990 Jaeckel et al.
4,926,095 A 5/1990 Shinoda et al.
4,964,591 A 10/1990 Wilmot et al.
4,968,571 A 11/1990 Gruenbaum et al.
4,999,176 A 3/1991 Iltis et al.
5,028,971 A 7/1991 Kim et al.
5,139,813 A 8/1992 Yira et al.
5,146,075 A 9/1992 Kim et al.
5,151,629 A 9/1992 VanSlyke
5,155,352 A 10/1992 Kim et al.
5,166,948 A 11/1992 Gavrilovic
5,177,486 A 1/1993 Kim et al.
5,183,593 A 2/1993 Durand et al.
5,192,868 A * 3/1993 Dudley ......................... 250/374
5,212,143 A 5/1993 Torobin
5,225,123 A 7/1993 Torobin
5,227,621 A 7/1993 Kim et al.
5,238,527 A 8/1993 Otani et al.
5,247,190 A 9/1993 Friend et al.
5,278,854 A 1/1994 Kim et al.
5,280,168 A 1/1994 Kim et al.
5,283,584 A 2/1994 Kim et al.
5,298,194 A 3/1994 Carter et al.
5,336,362 A 8/1994 Tanaka et al.
5,354,825 A 10/1994 Klainer et al.
5,397,759 A 3/1995 Torobin
5,399,502 A 3/1995 Friend et al.
5,409,783 A 4/1995 Tang et al.
5,469,020 A 11/1995 Herrick
5,480,723 A 1/1996 Klainer et al.
5,489,781 A * 2/1996 Mohr et al. ................ 250/385.1
5,510,678 A 4/1996 Sakai et al.
5,540,999 A 7/1996 Yamamoto et al.
5,541,012 A 7/1996 Ohwaki et al.
5,559,403 A 9/1996 Sakai et al.
5,575,956 A 11/1996 Hermansen et al.
5,592,052 A 1/1997 Maya et al.
5,643,692 A 7/1997 Ohmi
5,645,764 A 7/1997 Angelopoulos et al.
5,645,948 A 7/1997 Shi et al.
5,661,500 A 8/1997 Shinoda et al.
5,683,823 A 11/1997 Shi et al.
5,693,808 A 12/1997 Langhals
5,700,897 A 12/1997 Klainer et al.
5,755,999 A 5/1998 Shi et al.
5,770,921 A 6/1998 Aoki et al.
5,793,158 A 8/1998 Wedding
5,804,836 A 9/1998 Heeger et al.
5,807,627 A 9/1998 Friend et al.
5,837,165 A 11/1998 Otani et al.
5,876,542 A 3/1999 Fujiwara
5,879,808 A 3/1999 Wary et al.
5,891,367 A 4/1999 Bansheer et al.
5,900,327 A 5/1999 Pei et al.
5,908,581 A 6/1999 Chen et al.
5,917,693 A 6/1999 Kono et al.
5,918,364 A 7/1999 Kulesza et al.
5,935,720 A 8/1999 Chen et al.
5,973,328 A 10/1999 Hiller et al.
6,011,265 A 1/2000 Sauli
6,013,538 A 1/2000 Burrows et al.
6,020,078 A 2/2000 Chen et al.
6,027,670 A 2/2000 Otani et al.
6,069,442 A 5/2000 Hung et al.
6,080,690 A 6/2000 Lebby et al.
6,080,989 A 6/2000 Royle et al.
6,091,195 A 7/2000 Forrest et al.
6,096,825 A 8/2000 Garnier
6,118,214 A 9/2000 Marcotte
6,184,280 B1 2/2001 Shibuta
6,200,497 B1 3/2001 Park et al.
6,208,791 B1 3/2001 Bischel et al.
6,265,825 B1 7/2001 Asano
6,274,508 B1 8/2001 Jacobsen et al.
6,281,038 B1 8/2001 Jacobsen et al.
6,285,129 B1 9/2001 Park et al.
6,303,238 B1 10/2001 Thompson et al.
6,316,278 B1 11/2001 Jacobsen et al.
6,348,359 B1 2/2002 VanSlyke et al.
6,348,890 B1 2/2002 Stephens
6,355,932 B1 3/2002 Frederick
6,358,438 B1 3/2002 Isozaki et al.
6,361,885 B1 3/2002 Chou
6,411,035 B1 6/2002 Marcotte
6,468,638 B2 10/2002 Jacobsen et al.
6,468,808 B1 10/2002 Nie et al.
6,479,172 B2 11/2002 Hu et al.
6,501,091 B1 12/2002 Bawendi et al.
6,528,188 B1 3/2003 Suzuki et al.
6,529,573 B2 3/2003 Olsher et al.
6,538,263 B1 3/2003 Park et al.
6,555,408 B1 4/2003 Jacobsen et al.
6,558,576 B1 5/2003 Brielmann et al.
6,566,156 B1 5/2003 Sturm et al.
6,586,048 B2 7/2003 Welch et al.
6,590,346 B1 7/2003 Hadley et al.
6,599,446 B1 7/2003 Todt et al.
6,606,247 B2 8/2003 Credelle et al.
6,610,554 B2 8/2003 Yi et al.
6,614,175 B2 9/2003 Aziz et al.
6,624,414 B1 9/2003 Glesener
6,628,088 B2 9/2003 Kim et al.
6,650,045 B1 11/2003 Forrest et al.
6,654,435 B1 11/2003 Kronenberg et al.
6,665,044 B1 12/2003 Jacobsen et al.
6,670,645 B2 12/2003 Grushin et al.
6,683,663 B1 1/2004 Hadley et al.
6,692,326 B2 2/2004 Choi et al.
6,720,645 B2 4/2004 Yoshiike et al.
6,726,992 B1 4/2004 Yadav et al.
6,727,197 B1 4/2004 Wilson et al.
6,729,025 B2 5/2004 Farrell et al.
6,771,730 B1 8/2004 Dowben et al.

(56) References Cited

U.S. PATENT DOCUMENTS

| | | | |
|---|---|---|---|
| 6,998,624 | B2 | 2/2006 | Katagiri |
| 7,064,731 | B2 | 6/2006 | Doyen et al. |
| 7,145,612 | B2 | 12/2006 | Sakai et al. |
| 7,186,987 | B1 | 3/2007 | Doty et al. |
| 7,317,195 | B2 | 1/2008 | Eikman |
| 2002/0004111 | A1 | 1/2002 | Matsubara et al. |
| 2002/0063525 | A1 | 5/2002 | Choi et al. |
| 2002/0101151 | A1 | 8/2002 | Choi et al. |
| 2003/0003225 | A1 | 1/2003 | Choi et al. |
| 2003/0042850 | A1 | 3/2003 | Bertram et al. |
| 2003/0052596 | A1 | 3/2003 | Yi et al. |
| 2004/0001034 | A1 | 1/2004 | Marcotte |
| 2004/0009367 | A1 | 1/2004 | Hatwar |
| 2004/0023010 | A1 | 2/2004 | Bulovic et al. |
| 2004/0032466 | A1 | 2/2004 | Deguchi et al. |
| 2004/0037538 | A1 | 2/2004 | Schardt et al. |
| 2004/0159903 | A1 | 8/2004 | Burgener, II et al. |
| 2004/0196538 | A1 | 10/2004 | Burgener, II et al. |
| 2005/0093001 | A1 | 5/2005 | Liu et al. |
| 2005/0094109 | A1 | 5/2005 | Sun et al. |

* cited by examiner

DETECTOR ELEMENT WITH ANTENNA

This invention relates to the use of one or more detector elements with one or more antenna as a detector or monitor of high energy transmissions such as microwaves or other electromagnetic (EM) waves. One or more antenna such as a dipole antenna is attached to one or more detector elements to enhance or improve the detection of high energy transmissions. The antenna may be used alone or in combination with electrodes attached to the each element. In one embodiment, multiple antennae are used with each antenna being resonant over different frequency ranges. The invention is described herein with respect to gas-filled detector shells. However, the detector element may also be a solid body containing a detection material or substance.

In accordance with this invention, one or more detector shells containing one or more antenna is used to detect high energy transmissions including microwaves, lasers, radio frequency (RF) waves, radiation, and/or other electromagnetic signals or transmissions emitted by a source including a weapon system such as microwave weapon systems, pulsed electric lasers, radar transmitters, high voltage/high energy pulsed electrical devices, high power radio frequency radiators, satellites, and other high energy electrical devices. The detector shells may also be used as a safety device to warn and alert personnel working near high energy microwave devices, such as radar antenna, of leaks or other EM transmissions. The detector shells may also be used in medical facilities such as hospitals to alert personnel of EM leaks from high power medical equipment.

High power/high energy weapons are known in the prior art. These typically include high power/high energy output from a radio frequency (RF) generator such as an ultra-wide band high power RF radiator, a laser such as a pulsed electric laser, or a microwave weapon such as a microwave with high power and high energy densities. Examples of high power weapon systems are disclosed in U.S. Pat. No. 5,283,584 (Kim et al.), U.S. Pat. No. 5,280,168 (Kim et al.), U.S. Pat. No. 5,278,854 (Kim et al.), U.S. Pat. No. 5,227,621 (Kim et al.), U.S. Pat. No. 5,177,486 (Kim et al.), U.S. Pat. No. 5,155,352 (Kim et al.), U.S. Pat. No. 5,146,075 (Kim et al.), U.S. Pat. No. 5,028,971 (Kim et al.), and U.S. Pat. No. 4,964,591 (Kim et al.), all incorporated herein by reference.

The gas in a gas-filled detector shell is discharged by high energy transmission from a source causing a light emission from the plasma so as to immediately alert nearby people such as military, police, or like personnel of the dangerous transmissions, thereby giving such people the opportunity to take steps to de-energize the source of the discharge or move to a safe location. The gas discharge may emit a visible warning light and/or invisible light which excites a luminescent material that emits a visible light.

The detector shells may be positioned on and/or in any rigid, flexible, or semi-flexible substrate or fabric such as a wearable or a non-wearable fabric item to detect microwaves or other high energy transmissions from weapon systems or other sources. In one embodiment, one or more detector shells is positioned on a fabric material such as a blanket, rug, shawl, shirt, vest, coat, jacket, cloak, gloves, shoes, pants, belt, or other articles of clothing. In another embodiment, one or more detector shells is positioned on a bracelet, finger or toe ring, earrings, necklace or pendant, eye glasses, goggles or other portable article.

The detector shells may be located on a fabric article that contains electrically conductive materials such that the conductive materials serve as electrodes and/or an antenna. Examples of fabric articles composed of electrically conductive materials are disclosed in U.S. Pat. No. 4,803,096 (Kuhn et al.), U.S. Pat. No. 4,877,646 (Kuhn et al.), U.S. Pat. No. 6,080,690 (Lebby et al.), U.S. Pat. No. 6,727,197 (Wilson et al.), and U.S. Pat. No. 6,729,025 (Farrell et al.), all incorporated herein by reference.

Static charge resistant materials may be used. Examples of static charge resistant synthetic yarns include U.S. Pat. No. 3,778,331 (Scharf) and U.S. Pat. No. 3,900,624 (Schare), both incorporated herein by reference.

The detector shells with antenna may be loosely scattered on a surface such as the ground or the roof of a structure such as a building or tent to detect high energy transmissions from any source such as a satellite.

The shells containing antennae may be isolated or interconnected by one or more electrodes connected to electronic circuitry. In one embodiment, one or more gas-filled shells is connected to one or more antenna to enhance the detection of the high energy transmission. One or more gas-filled detector shells may be used in an AC or DC gas discharge device such as a plasma display panel (PDP). A multiplicity of gas-filled detector shells are positioned on or in a PDP substrate and electrically connected to electrical conductors such as electrodes to define a gas discharge cell, pixel, subcell, or subpixel. In one embodiment, voltages are applied sufficient to bring the gas close to discharge such that incoming high energy transmission causes the gas to discharge.

The gas-filled detector shell comprises a hollow gas-filled body of any suitable geometric shape including a gas-filled detector disc, dome, sphere, cube, and cuboid. A flat or domed (round) side of each gas-filled detector shell is in contact with the surface of a substrate or embedded partially or wholly in a substrate. The substrate may be rigid, or semi-flexible, or flexible, with a flat, curved, or irregular surface. Each substrate may comprise a single layer or a composite of multiple layers of the same or different materials. The gas discharge device may comprise a single substrate or multiple substrate devices.

The antennae are used alone or in combination with electrodes. The antenna materials may be the same as the electrode material or of another selected material. Each antenna may be attached by any suitable means to the detector. Conductive bonding substances may be used to enhance the connection of the antenna to the detector shell. The length of each antenna is selected for a given wavelength and/or frequency, typically about 0.5 inches to about 5 inches depending on the EM frequency to be detected of a detector shell contains two or more antennae, each antennae may be of a different length to detect transmissions of different frequencies.

In one embodiment, one or more antenna is attached to a primary detector shell which is connected to one or more secondary shells by an electrode such that the antenna services both the primary and secondary shells. It is also contemplated that the electrodes may be positioned so as to also serve as antenna.

DETAILED DESCRIPTION OF THE DRAWINGS

Figure 1:
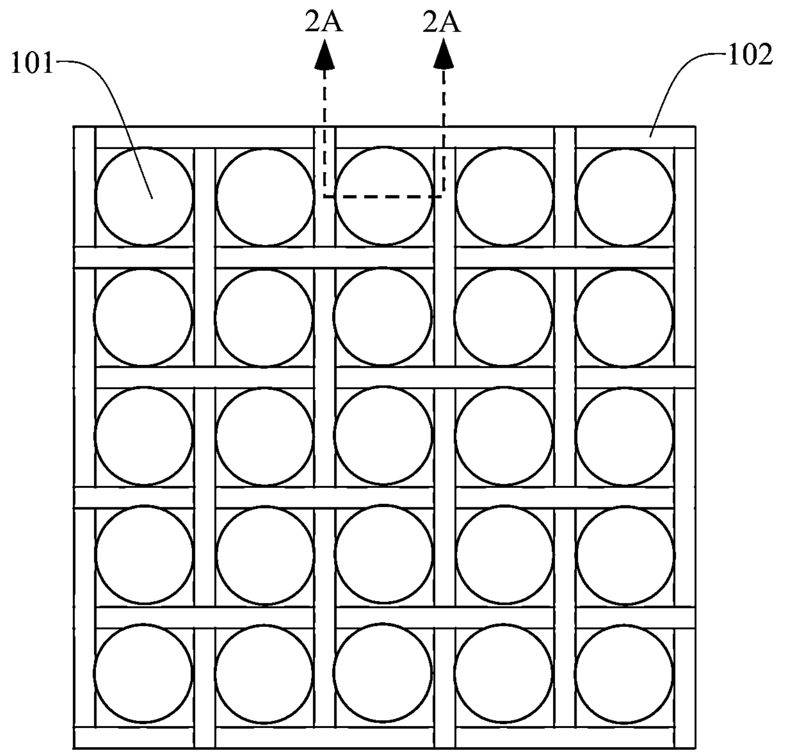
FIG. 1 is a top view of detector shells embedded in a substrate.

FIG. 1 shows a top view of gas-filled detector shells 101 embedded in a substrate 102. The substrate may be flexible, semi-flexible, or rigid. Examples of flexible substrates include fabric or fiber materials such as cotton, nylon, polyester, spandex, satin, silk, wool, denim, fleece, other textiles, and the like. Impact resistant fibers such as Kevlar, Spectra, Aramid fibers, Dyneema, and the like are also contemplated.

Figure 2A:
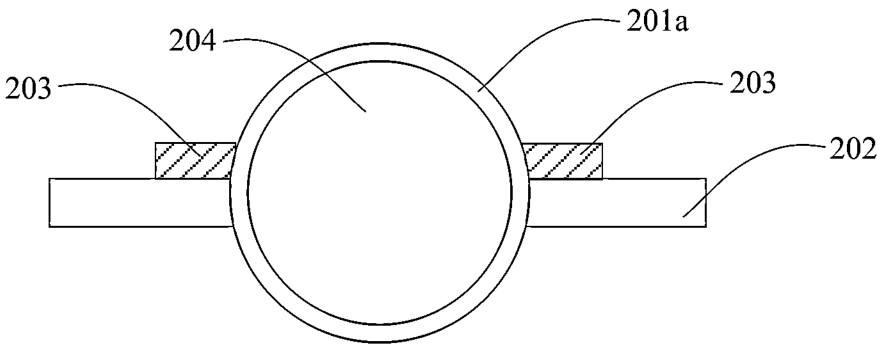
FIG. 2A is a section 2A-2A view of a detector sphere embedded in a substrate shown in FIG. 1.

FIG. 2A shows a section 2A-2A view of a gas-filled detector sphere 201*a* embedded within a substrate 202. Gas 204 is contained within the sphere 201*a*. Optional electrodes or antenna 203 are attached or bonded to the sphere 201*a* and substrate 202.

Figure 2B:
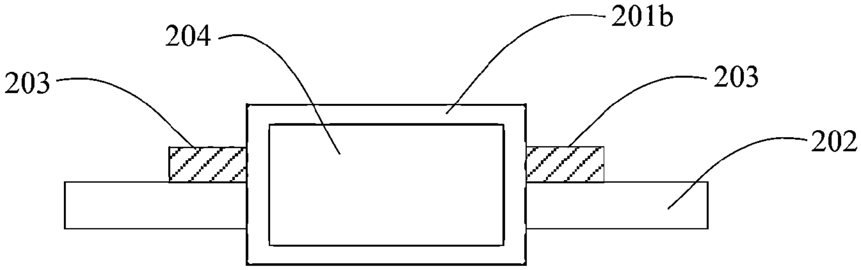
FIG. 2B is an alternate section 2A-2A view of a detector disc embedded in a substrate.

FIG. 2B shows an alternate section 2A-2A view of a gas-filled detector disc 201*b* embedded within a substrate 202. Gas 204 is contained within the disc 201*b*. Optional electrodes or antenna 203 are attached or bonded to the disc 201*b* and substrate 202.

Figure 2C:
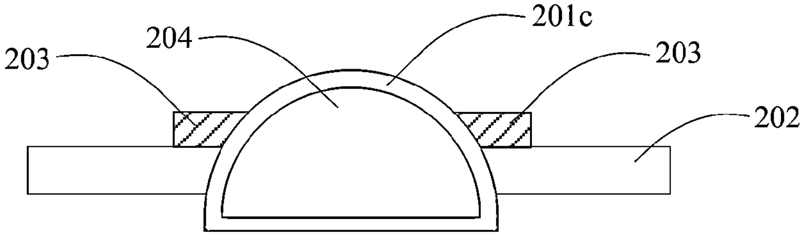
FIG. 2C is an alternate section 2A-2A view of a detector dome embedded in a substrate.

FIG. 2C shows an alternate section 2A-2A view of a gas-filled detector dome 201*c* embedded within a substrate 202. Gas 204 is contained within the dome 201*c*. Optional electrodes or antenna 203 are attached or bonded to the dome 201*c* and substrate 202.

Figure 3A:
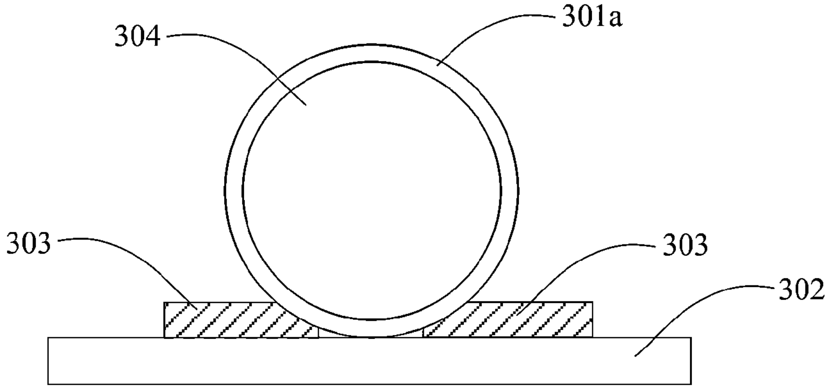
FIG. 3A is an alternate section 2A-2A view of a detector sphere on the surface of a substrate.

FIG. 3A shows an alternate section 2A-2A view of a gas-filled detector sphere 301*a* located on the surface of a substrate 302. Gas 304 is contained within the sphere 301*a*. Optional electrodes or antenna 303 are attached or bonded to the sphere 301*a* and substrate 302.

Figure 3B:
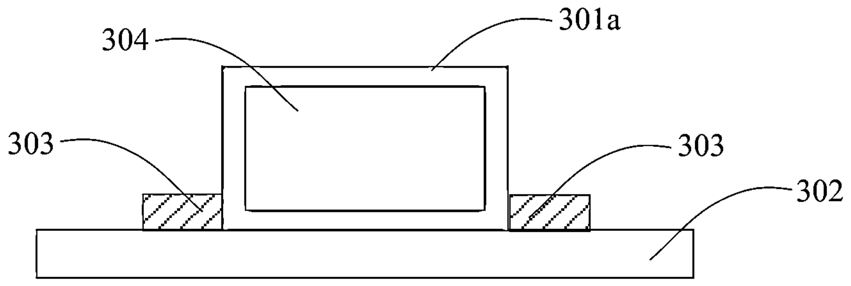
FIG. 3B is an alternate section 2A-2A view of a detector disc on the surface of in a substrate.

FIG. 3B shows an alternate section 2A-2A view of a gas-filled detector disc 301*b* located on the surface of a substrate 302. Gas 304 is contained within the disc 301*b*. Optional electrodes or antenna 303 are attached or bonded to the disc 301*b* and substrate 302.

Figure 3C:
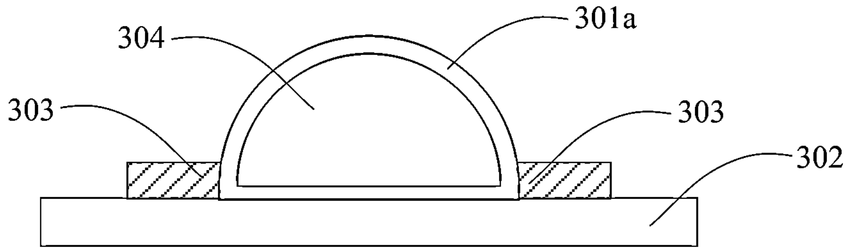
FIG. 3C is an alternate section 2A-2A view of a detector dome on the surface of in a substrate.

FIG. 3C shows an alternate section 2A-2A view of a gas-filled detector dome 301*c* located on the surface of a substrate 302. Gas 304 is contained within the dome 301*c*. Optional electrodes or antenna 303 are attached or bonded to the dome 301*c* and substrate 302.

Figure 4:
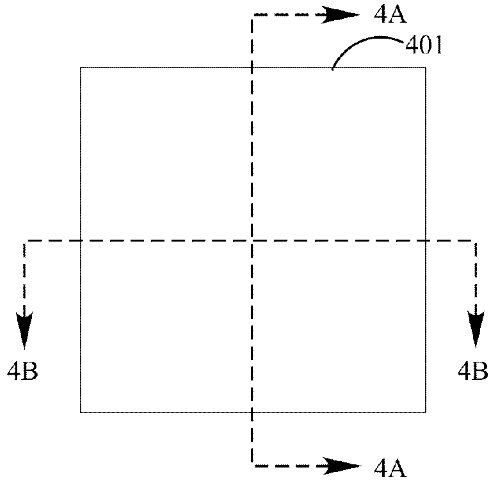
FIGS. 4, 4A, and 4B show a detector cube.
Figure 4A:
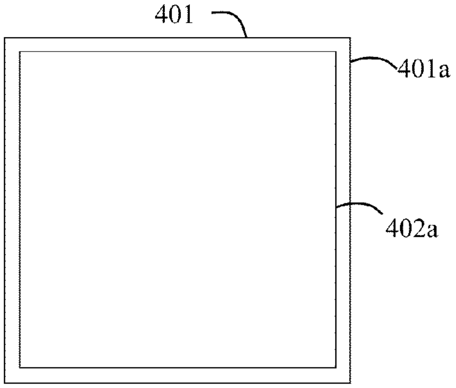
Figure 4B:
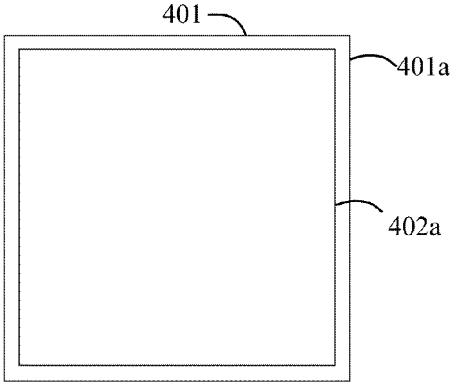

FIGS. 4, 4A, and 4B show a detector cube. A detector cube is a hollow cube with six flat sides. It is a regular shape with six congruent square faces, the angle between any two adjacent faces being a right angle. It can be formed on a mold under pressure with or without heat.

As illustrated in FIG. 4, the detector cube has opposing flat, parallel sides 401.

FIG. 4A is a section 4A-4A view of FIG. 4 with flat, parallel sides 401, inside wall surface 402*a*, and outer wall surface 401*a*.

FIG. 4B is a section 4B-4B view of FIG. 4 with flat, parallel sides 401, inside wall surface 402*a*, and outer wall surface 401*a*.

Figure 5:
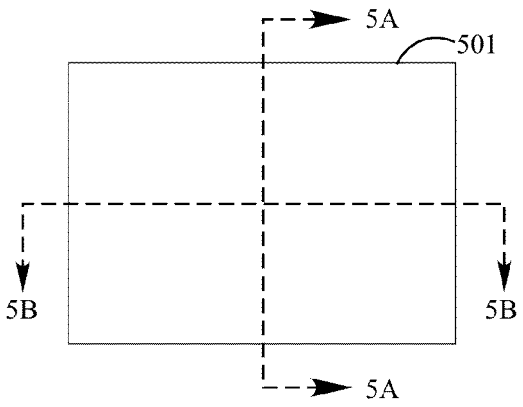
FIGS. 5, 5A, and 5B show a detector cuboid.
Figure 5A:
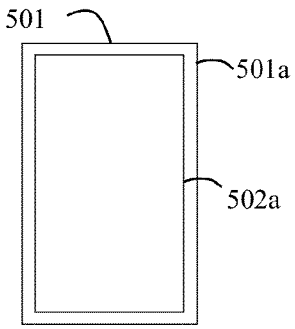
Figure 5B:
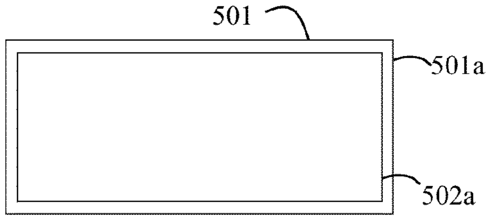

FIGS. 5, 5A, and 5B show a detector cuboid. As illustrated in FIG. 5, the detector cuboid has opposing flat, parallel sides 501. A detector cuboid is a hollow cube with six flat sides of different dimensions. The cross-section along any axis is a rectangle, trapezoid, parallelogram, or other flat, four sided shape. It is also known as a rectangular parallelepiped. It can be made in the same way as a cube.

FIG. 5A is a section 5A-5A view of FIG. 5 with flat, parallel sides 501, inside wall surface 502*a*, and outer wall surface 501*a*.

FIG. 5B is a section 5B-5B view of FIG. 5 with flat, parallel sides 501, inside wall surface 502*a*, and outer wall surface 501*a*.

Figure 6:
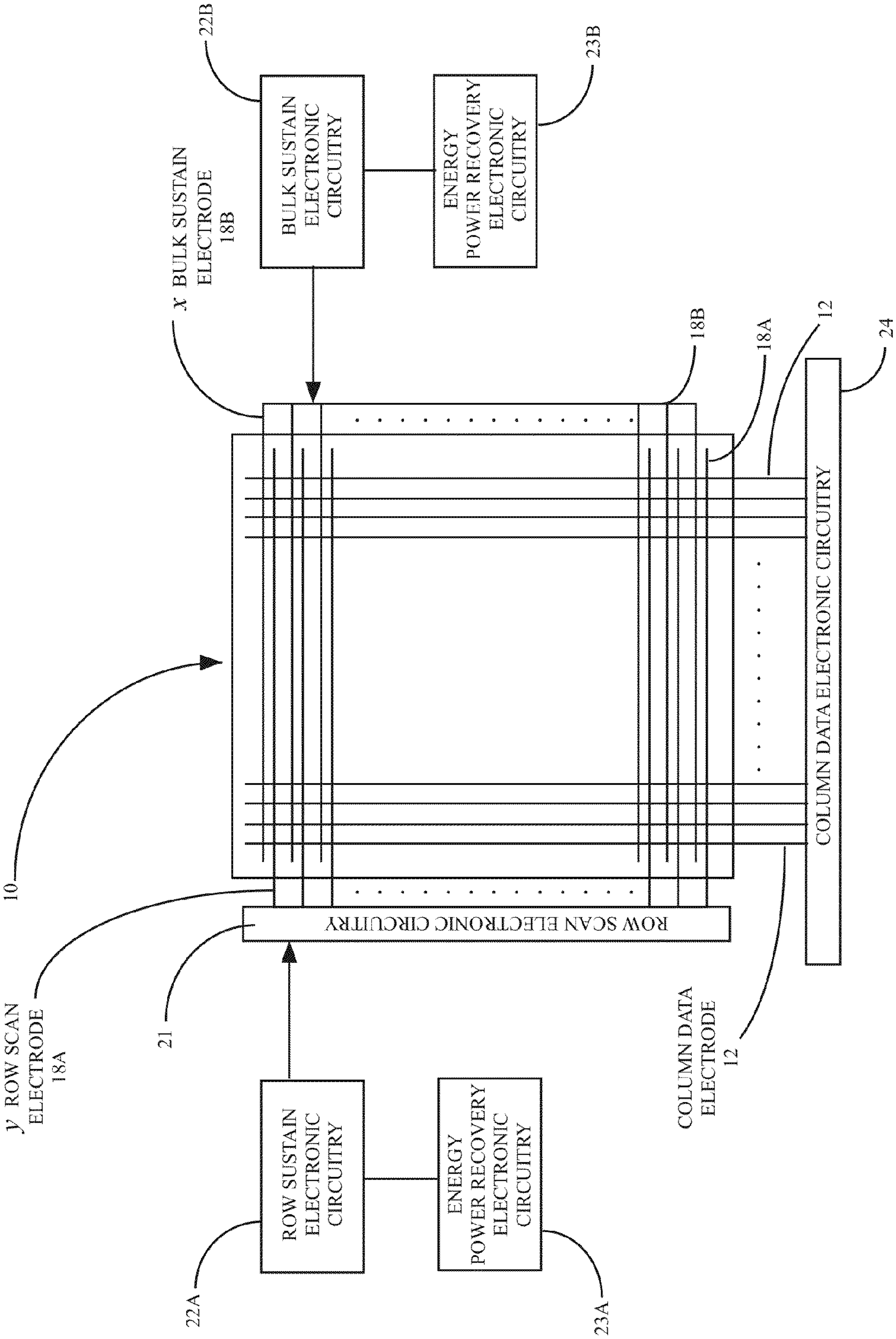
FIG. 6 is a block diagram of an AC PDP with electronic circuitry.

In one embodiment, the gas discharge detector device with gas-filled detector shells is operated with suitable electronics. Driving the gas-filled detector shells slightly below the firing or gas discharge voltage increases the sensitivity of the detector shell to the high energy transmissions. FIG. 6 is a block diagram of an AC plasma display panel (PDP) 10 with electronic circuitry 21 for y row scan electrodes 18A, bulk sustain electronic circuitry 22B for x bulk sustain electrode 18B and column data electronic circuitry 24 for the column data electrodes 12. The pixels or sub-pixels of the PDP comprise detector plasma-shells are not shown in FIG. 6. There is also shown row sustain electronic circuitry 22A with an energy power recovery electronic circuit 23A. There is also shown energy power recovery electronic circuitry 23B for the bulk sustain electronic circuitry 22B. The electronics architecture used in FIG. 6 may be as described in U.S. Pat. No. 5,661,500 (Shinoda et al.). In addition, other architectures known in the prior art may be utilized. These architectures including Shinoda '500 may be used to address detector plasma-shells, including detector plasma-spheres, detector plasma-discs, or detector plasma-domes in a PDP.

Figure 7:
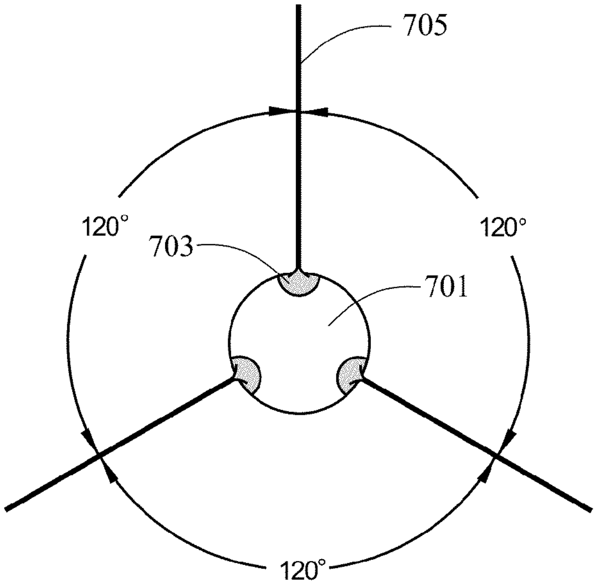
FIG. 7 is a tripole antenna.

FIG. 7 is a detector shell 701 with three antennae or tripole 705 spaced 120° apart and antenna connections 703 to the detector shell 701. The tripole consists of three elements 120° apart. This antenna works in a manner similar to the four element antenna in that the vector sum of the energy coupled on the three elements is identically equal to the energy that would be coupled to a dipole whose orientation was optimal for a particular polarization of an incident RF signal. Like the four pole antenna, the tripole couples horizontal, vertical, and circularly polarized signals equally while using slightly less space. The resonance of each leg is determined in the same manner as the dipole. The RF coupled to this antenna would be any RF wave propagating into or out of the plane. Each antenna may be of a different length to be resonant over a different frequency range.

Figure 8:
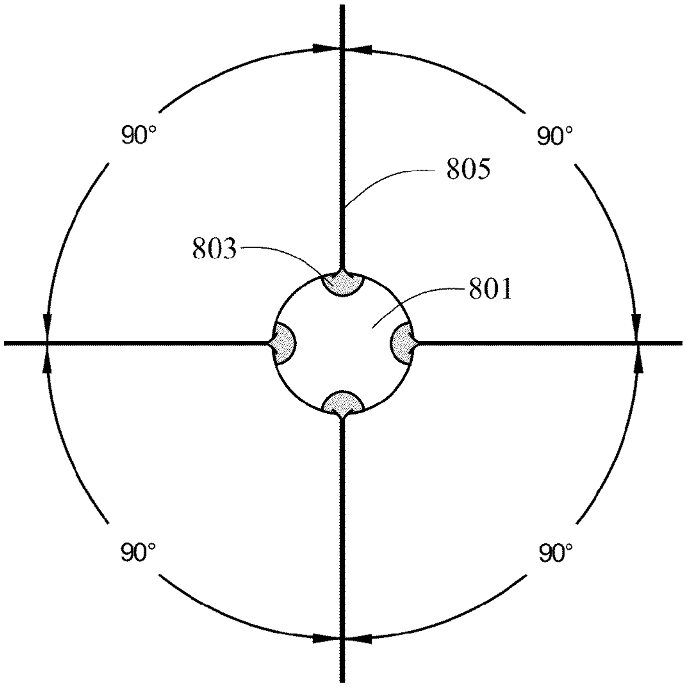
FIG. 8 is a four pole antenna.

FIG. 8 is a detector shell 801 with four antennae 805 spaced 90° apart and antenna connections 803 to the detector shell 801. The four pole antenna is the equivalent of two dipole antennas each polarized 90° from each other. The ability of a single dipole antenna to couple energy is proportional to the cosine squared of the angle between the antenna and the electric component of the incident RF. By combining two dipoles separated by 90°, energy that is not coupled by one dipole will be coupled by the other, since $\cos(x)^2+\cos(x+90°)^2=\cos(x)^2+\sin(x)^2=1$. Therefore the antenna couples horizontal, vertical, and circularly polarized signals equally. The resonance of each leg is determined in the same manner as the dipole. The RF coupled to this antenna would be any RF wave propagating into or out of the plane.

Figure 9:
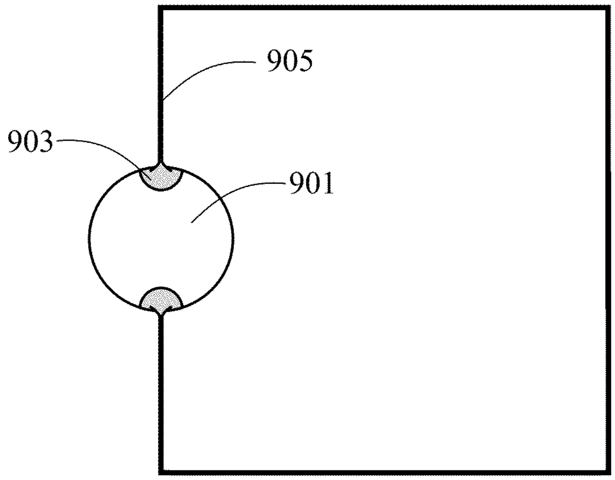
FIG. 9 is a detector shell with a loop antenna.

FIG. 9 is a detector shell 901 with a loop antenna 905 and antenna connections 903 to the detector shell 901. The loop antenna is a magnetically coupled antenna. Where a dipole couples energy proportional to the electric component that runs parallel to its elements, the loop antenna couples energy by inducing a current in the conductor forming the loop from the magnetic component of the incident RF that passes through the enclosed area of the loop as per Maxwell's and Ampere's Laws. The induced current causes an electrical charge to be stored in parasitic capacitance of the conductor. Since the current induced on the conductor travels at finite speed, resonant conditions are achieved in the loop when the total length of the loop conductor is equal to the wavelength of the incident RF corrected for the propagation speed of the current in the wire. According to Ampere's Law, the energy coupled is proportional to the magnetic component of the RF that passes perpendicularly through the area enclosed by the loop. Therefore the energy coupled is proportional to the cosine squared of the angle between the magnetic component of the incident RF and the plane of the loop.

Figure 10A:
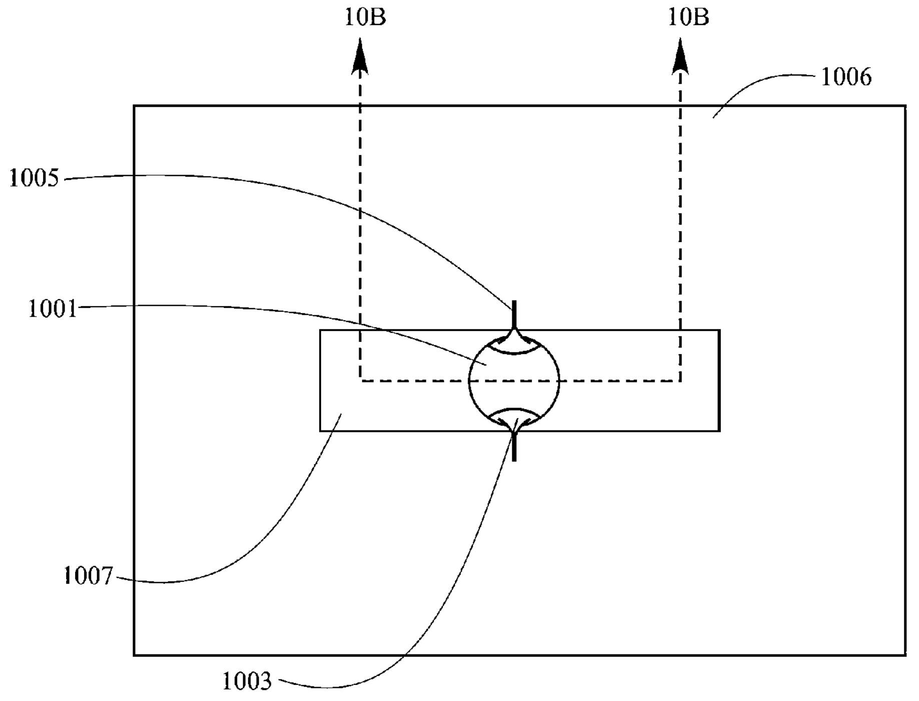
FIG. 10A is a top view of a detector shell in a plate or slot antenna.

FIG. 10A is a top view of a detector shell 1001 in a slot antenna with antenna connections 1003 and 1005. The slot antenna is formed by cutting a resonant slot 1007 out of a large sheet of conductor 1006. The sheet 1006 should be large enough that it appears to be infinite to the incident RF (typically three to four wavelengths in each direction). When an RF wave encounters an infinite sheet of conductor 1006, the electric component causes surface currents on the sheet that would make the sheet act as a reflector. However, the slot 1007 causes a discontinuity to these currents forcing the current to flow around the slot. Since the currents propagate at a finite speed around the slot, the length of the slot creates resonant conditions in these currents. This resonance creates a high-voltage node across the short dimension of the slot 1007 where a detector shell 1001 can be placed. Since the slot 1007 acts by disrupting the surface currents, the polarization of the RF coupled by this antenna is one having an electric component perpendicular to the long dimension of the slot.

Figure 10B:
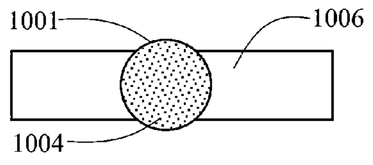
FIG. 10B is a section 10B-10B view of FIG. 10A.

FIG. 10B is a section 10B-10B view of FIG. 10A. FIG. 10B shows the detector shell 1001, ionized gas 1004, and conductor 1006

FIGS. 11A, 11B, 11C, and 11D are examples of clothing articles used with detector shells. These are illustrated with dipole antenna, but additional antenna can be used including tripole, four pole, or more. In addition, there can be used a loop antenna, a slot antenna, and other geometric configurations.

Figure 11A:
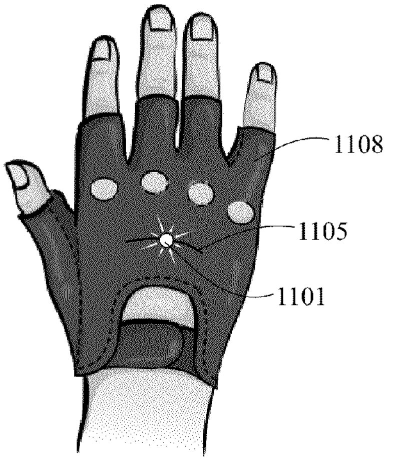
FIGS. 11A, 11B, 11C, and 11D are examples of clothing articles used with detector shells.

FIG. 11A shows a glove 1108 with a detector shell 1101 and one or more antenna 1105 attached to the glove 1108.

Figure 11B:
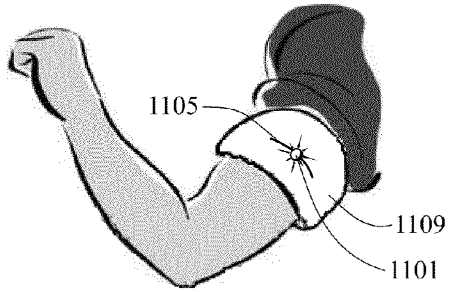

FIG. 11B shows an arm band 1109 with a detector shell 1101 and one or more antenna 1105 attached to the arm band 1109.

Figure 11C:
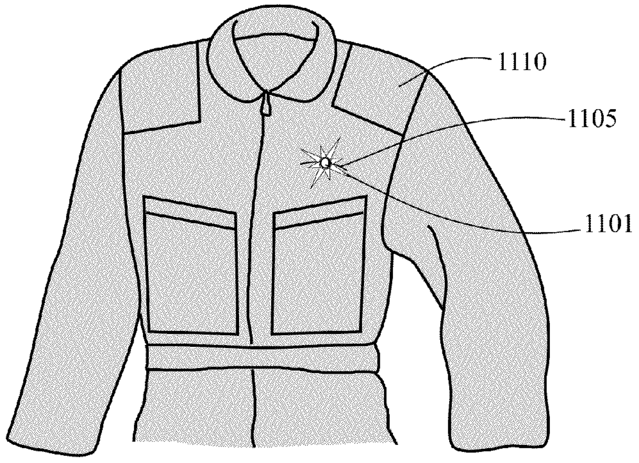

FIG. 11C shows a coverall 1110 with a detector shell 1101 and one or more antenna 1105 attached to the coverall 1110.

Figure 11D:
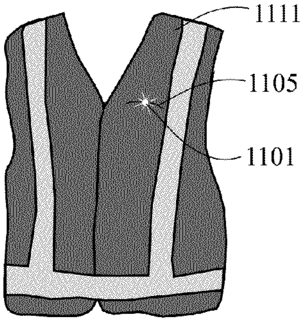

FIG. 11D shows a vest 1111 with a detector shell 1101 and one or more antenna 1105 attached to the vest 1111.

Methods of Producing Shells

Any suitable method or process may be used to produce the detector shells. Methods and processes for the production of hollow shells or microspheres are known in the prior art. Microspheres have been formed from glass, ceramic, metal, plastic, and other inorganic and organic materials. Varying methods and processes for producing shells and microspheres have been disclosed and practiced in the prior art. Some of the prior art methods for producing microspheres are disclosed hereafter.

One method used to produce hollow glass microspheres comprises incorporating a blowing gas into the lattice of a glass while in frit form. The blowing gases typically include $SO_2$, $CO_2$, and $H_2O$. The frit is heated and glass bubbles are formed by the in-permeation of the blowing gas. Microspheres formed by this method have diameters ranging from about 5 μm to approximately 5,000 μm. This method produces shells with a residual blowing gas enclosed in the shell, which may quench a gas discharge.

Methods of manufacturing glass frit for forming hollow microspheres are disclosed by U.S. Pat. No. 4,017,290 (Budrick et al.) and U.S. Pat. No. 4,021,253 (Budrick et al.). Budrick et al. '290 discloses a process whereby occluded material gasifies to form the hollow microsphere.

U.S. Pat. No. 4,257,798 (Hendricks et al.) is incorporated herein by reference. Hendricks et al. '798 discloses a method for manufacturing small hollow glass spheres. The gases include argon, krypton, xenon, bromine, DT, hydrogen, deuterium, helium, hydrogen, neon, and carbon dioxide. Other Hendricks patents for the manufacture of glass spheres include U.S. Pat. Nos. 4,133,854 and 4,186,637, both incorporated herein by reference.

Microspheres are also produced as disclosed in U.S. Pat. No. 4,415,512 (Torobin), incorporated herein by reference. This method by Torobin comprises forming a film of molten glass across a blowing nozzle and applying a blowing gas at a positive pressure on the inner surface of the film to blow the film and form an elongated cylinder shaped liquid film of molten glass. An inert entraining fluid is directed over and around the blowing nozzle at an angle to the axis of the blowing nozzle so that the entraining fluid dynamically induces a pulsating or fluctuating pressure at the opposite side of the blowing nozzle in the wake of the blowing nozzle. The continued movement of the entraining fluid produces asymmetric fluid drag forces on a molten glass cylinder, which forces closed and detached the elongated cylinder from the coaxial blowing nozzle. Surface tension forces acting on the detached cylinder form the latter into a spherical shape, which is rapidly cooled and solidified by cooling means to form a glass microsphere.

In one embodiment of the above method for producing the microspheres, the ambient pressure external to the blowing nozzle is maintained at a super atmospheric pressure. The ambient pressure external to the blowing nozzle is such that it substantially balances, but is slightly less than the blowing gas pressure. Such a method is disclosed by U.S. Pat. No. 4,303,432 (Torobin) and WO 8000438A1 (Torobin), both incorporated herein by reference. The microspheres may also be produced using a centrifuge apparatus and method as disclosed by U.S. Pat. No. 4,303,433 (Torobin) and WO8000695A1 (Torobin), both incorporated herein by reference. Other methods for forming microspheres of glass, ceramic, metal, plastic, and other materials are disclosed in other Torobin patents including U.S. Pat. Nos. 5,397,759; 5,225,123; 5,212,143; 4,793,980; 4,777,154; 4,743,545; 4,671,909; 4,637,990; 4,582,534; 4,568,389; 4,548,196; 4,525,314; 4,363,646; 4,303,736; 4,303,732; 4,303,731; 4,303,603; 4,303,431; 4,303,730; 4,303,729; and 4,303,061, all incorporated herein by reference. The Torobin patents and processes may be used to form both solid and gas-filled shells.

U.S. Pat. No. 3,607,169 (Coxe) discloses an extrusion method in which a gas is blown into molten glass and individual shells are formed. As the shells leave the chamber, they cool and a portion of the gas is trapped inside. Because the shells cool and drop at the same time, the shells may not form uniformly. It is also difficult to control the amount and composition of gas that remains in the shell. U.S. Pat. No. 4,349,456 (Sowman), incorporated herein by reference, discloses a process for making ceramic metal oxide microspheres by blowing a slurry of ceramic and highly volatile organic fluid through a coaxial nozzle. As the liquid dehydrates, gelled microcapsules are formed. These microcapsules are recovered by filtration and then dried and fired to form microspheres. Prior to firing, the microcapsules are sufficiently porous such that, if placed in a vacuum during the firing process, the gases are removed and the resulting microspheres will generally be impermeable to ambient gases. The shells formed with this method may be filled with a variety of gases and pressurized from near vacuums to above atmosphere.

U.S. Patent Application Publication 2002/0004111 (Matsubara et al.), incorporated herein by reference, discloses a method of preparing hollow glass microspheres by adding a combustible liquid (kerosene) to a material containing a foaming agent. Methods for forming microspheres are also disclosed in U.S. Pat. No. 3,848,248 (MacIntyre), U.S. Pat. No. 3,998,618 (Kreick et al.), and U.S. Pat. No. 4,035,690 (Roeber), discussed above and incorporated herein by reference. Methods of manufacturing hollow microspheres are disclosed in U.S. Pat. No. 3,794,503 (Netting), U.S. Pat. No. 3,796,777 (Netting), U.S. Pat. No. 3,888,957 (Netting), and U.S. Pat. No. 4,340,642 (Netting et al.), all incorporated herein by reference.

Other prior art methods for forming microspheres are disclosed in the prior art including U.S. Pat. No. 3,528,809 (Farnand et al.), U.S. Pat. No. 3,975,194 (Farnand et al.), U.S. Pat. No. 4,025,689 (Kobayashi et al.), U.S. Pat. No. 4,211,738 (Genis), U.S. Pat. No. 4,307,051 (Sargeant et al.), U.S. Pat. No. 4,569,821 (Duperray et al.), U.S. Pat. No. 4,775,598 (Jaeckel), and U.S. Pat. No. 4,917,857 (Jaeckel et al.), all of which are incorporated herein by reference. These references disclose a number of methods which comprise an organic core such as naphthalene or a polymeric core such as foamed polystyrene which is coated with an inorganic material such as aluminum oxide, magnesium, refractory, carbon powder, and the like. The core is removed by pyrolysis, sublimation, or decomposition and the inorganic coating sintered at an elevated temperature to form a sphere or microsphere. Farnand et al. '809 discloses the production of hollow metal spheres by coating a core material such as naphthalene or anthracene with metal flakes such as aluminum or magnesium. The organic core is sublimed at room temperature over 24 to 48 hours. The aluminum or magnesium is then heated to an elevated temperature in oxygen to form aluminum oxide or magnesium oxide. The core may also be coated with a metal oxide such as aluminum oxide and reduced to metal. The resulting hollow spheres are used for thermal insulation, plastic filler, and bulking of liquids such as hydrocarbons.

Farnand '194 discloses a similar process comprising polymers dissolved in naphthalene including polyethylene and polystyrene. The core is sublimed or evaporated to form hollow spheres or microballoons. Kobayashi et al. '689 discloses the coating of a core of polystyrene with carbon powder. The core is heated and decomposed and the carbon powder heated in argon at 3000° C. to obtain hollow porous graphitized spheres. Genis '738 discloses the making of lightweight aggregate using a nucleus of expanded polystyrene pellet with outer layers of sand and cement. Sargeant et al. '051 discloses the making of lightweight refractories by wet spraying core particles of polystyrene with an aqueous refractory coating such as clay with alumina, magnesia, and/or other oxides. The core particles are subject to a tumbling action during the wet spraying and fired at 1730° C. to form porous refractory. Duperray et al. '821 discloses the making of a porous metal body by suspending metal powder in an organic foam which is heated to pyrolyze the organic and sinter the metal. Jaeckel '598 and Jaeckel et al. '857 disclose the coating of a polymer core particle such as foamed polystyrene with metals or inorganic materials followed by pyrolysis on the polymer and sintering of the inorganic materials to form the sphere. Both disclose the making of metal spheres such as copper or nickel spheres which may be coated with an oxide such as aluminum oxide. Jaeckel et al. '857 further discloses a fluid bed process to coat the core.

Geometric Shape

The detector shells may be of any suitable hollow geometric shape including a sphere, disc, dome, cube, cuboid, or other geometric shape.

A sphere is a spherical body with relatively uniform shell thickness. A hollow gas-filled sphere contains an ionizable gas at a desired mixture and pressure. The gas is selected to produce visible, ultraviolet (UV), and/or infrared (IR) photons during ionization or gas discharge when subjected to microwaves or other high energy transmissions. The shell material may be selected to optimize any required dielectric and/or conductive properties and optical transmissivity. Additional beneficial materials such as luminescent substances may be added to the inside surface or outer surface of the sphere. Luminescent substances may also be added directly to the shell material, for example incorporated into the shell material during or after formation of the shell.

A disc is similar to a sphere in material composition. The geometric shape differs from the sphere in that the disc has two opposing substantially flat sides such as the top and bottom. A sphere may be flattened to form a disc by applying heat and pressure simultaneously to the top and bottom of the sphere using two substantially flat and ridged members, either of which may be heated. The disc may have other sides that are substantially flat or round (dome).

A dome is similar to a sphere and disc in material composition. It differs in geometric shape in that one side is substantially flat and an opposite side is substantially round or domed. Other sides of the dome may be flat or domed. A sphere may be flattened on one or more sides to form a dome, typically by applying heat and pressure simultaneously to the top and bottom of the sphere using one substantially flat and ridged member and one substantially elastic member. In one embodiment, the substantially rigid member is heated. As used herein a dome side has a substantially curved or round surface that is convex.

A cube is a hollow shell with six flat sides. It is a regular shape with six congruent square faces, the angle between any two adjacent faces being a right angle. It can be formed on a mold under pressure with or without heat.

A cuboid is an elongated cube with six flat sides. It is also known as a rectangular parallelepiped. It can be made in the same way as a cube.

Shell Materials

The detector shell may be constructed of any suitable material including glass, ceramic, plastic, metal, metalloids, and so forth. In the practice of this invention, it is contemplated that the shell may be made of any suitable inorganic compounds of metals and/or metalloids, including mixtures or combinations thereof. Contemplated inorganic compounds include the oxides, carbides, nitrides, nitrates, silicates, silicides, aluminates, phosphates, sulfates, sulfides, borates, and borides.

The metals and/or metalloids are selected from lithium, sodium, potassium, rubidium, cesium, magnesium, calcium, strontium, barium, scandium, yttrium, lanthanum, cerium, praseodymium, neodymium, promethium, samarium, europium, gadolinium, terbium, erbium, actinium, thorium, protactinium, uranium, neptunium, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, copper, silver, zinc, cadmium, boron, aluminum, gallium, indium, thallium, carbon, silicon, germanium, tin, lead, phosphorus, arsenic, antimony and bismuth.

Suitable inorganic materials include magnesium oxide(s), aluminum oxide(s), zirconium oxide(s), and silicon carbide(s) such as MgO, $Al_2O_3$, $ZrO_2$, $SiO_2$, and/or SiC.

In one embodiment, the shell is composed wholly or in part of one or more borides of one or more members of Group IIIB of the Periodic Table and/or the rare earths including both the Lanthanide Series and the Actinide Series of the Periodic Table. Contemplated Group IIIB borides include scandium boride and yttrium boride. Contemplated rare earth borides of the Lanthanides and Actinides include lanthanum boride, cerium boride, praseodymium boride, neodymium boride, gadolinium boride, terbium boride, actinium boride, and thorium boride.

In one embodiment, the shell is composed wholly or in part of one or more Group IIIB and/or rare earth hexaborides with the Group IIIB and/or rare earth element being one or more members selected from Sc, Y, La, Ce, Pr, Nd, Sm, Eu, Gd, Tb, Dy, Ho, Yb, Ac, Th, Pa, and U. Examples include lanthanum hexaboride, cerium hexaboride, and gadolinium hexaboride.

Rare earth borides, including rare earth hexaboride compounds, and methods of preparation are disclosed in U.S. Pat. No. 3,258,316 (Tepper et al.), U.S. Pat. No. 3,784,677 (Versteeg et al.), U.S. Pat. No. 4,030,963 (Gibson et al.), U.S. Pat. No. 4,260,525 (Olsen et al.), U.S. Pat. No. 4,999,176 (Iltis et al.), U.S. Pat. No. 5,238,527 (Otani et al.), U.S. Pat. No. 5,336,362 (Tanaka et al.), U.S. Pat. No. 5,837,165 (Otani et al.), and U.S. Pat. No. 6,027,670 (Otani et al.).

Group IIA alkaline earth borides are contemplated including borides of Mg, Ca, Ba, and Sr. In one embodiment, there is used a material containing trivalent rare earths and/or trivalent metals such as La, Ti, V, Cr, Al, Ga, and so forth having crystalline structures similar to the perovskite structure, for example as disclosed in U.S. Pat. No. 3,386,919 (Forrat), incorporated herein by reference.

The shell may also be composed of or contain carbides, borides, nitrides, silicides, sulfides, oxides and other compounds of metals and/or metalloids of Groups IV and V as disclosed and prepared in U.S. Pat. No. 3,979,500 (Sheppard et al.), incorporated herein by reference. Compounds including borides of Group IVB metals such as titanium, zirconium, and hafnium and Group VB metals such as vanadium, niobium, and tantalum are contemplated.

In one embodiment, the shell is made of fused particles of glass, ceramic, glass ceramic, refractory, fused silica, quartz, or like amorphous and/or crystalline materials including mixtures of such. In one embodiment, a ceramic material is selected based on its transmissivity to light after firing. This may include selecting ceramic material with various optical cutoff frequencies to produce various colors. One material contemplated for this application is aluminum oxide. Aluminum oxide is transmissive from the UV range to the IR range. Because it is transmissive in the UV range, luminescent materials such as phosphors excited by UV may be applied to the exterior of an aluminum oxide to produce various colors. The application of the phosphor to the exterior of the shell may be done by any suitable means before or after the shell is positioned in the detector device. There may be several layers or coatings of phosphors, each of a different composition, applied to the exterior of the shell.

In one specific, the shell is made of an aluminate silicate or contains a layer of aluminate silicate. When the ionizable gas mixture contains helium, the aluminate silicate is especially beneficial in preventing the escape of helium. It is also contemplated that the shell may be made of lead silicates, lead phosphates, lead oxides, borosilicates, alkali silicates, aluminum oxides, and pure vitreous silica.

The shell may be made in whole or in part from one or more materials such as magnesium oxide having a sufficient Townsend coefficient. These include inorganic compounds of magnesium, calcium, strontium, barium, gallium, lead, aluminum, boron, and the rare earths especially lanthanum, cerium, actinium, and thorium. The contemplated inorganic compounds include oxides, carbides, nitrides, nitrates, silicates, silicides, aluminates, phosphates, sulphates, sulfides, borates, borides, and other inorganic compounds of the above and other elements.

The shell may also contain or be partially or wholly constructed of luminescent materials such as inorganic and/or organic phosphor(s). The phosphor may be a continuous or discontinuous layer or coating of inorganic and/or organic substance on the interior or exterior of the shell. Inorganic and/or organic luminescent particles may also be introduced inside the shell or embedded within the shell. Inorganic and/or organic luminescent quantum dots may also be incorporated into the shell.

Detector Materials

The detector element such as a detector shell may be made wholly or in part of one or more substances or materials that detect or sense energy transmission. A gas-filled detector shell may be made of a detector material. The detector substances include both inorganic and organic materials including secondary electron emission materials. The detector shell may be made wholly or in part of one or more solid state semiconductor neutron detectors such as compounds of lithium, boron, cadmium, and gadolinium.

Examples of detector materials include lithium-6, lithium iodide, lithium fluoride, lithium gadolinium borate, lithium lanthanide borate, lithium indium sulfide, lithium indium selenide, lithium indium phosphide, boron-10, boron phosphide, boron carbide, cadmium zinc telluride, gadolinium arsenide, gadolinium orthosilicate, mercuric iodide, lead iodide, thallium bromide, thallium bromoiodide, mercuric bromoiodide, germanium, sodium iodide, cesium iodide, anthracene, bismuth germanium oxide, cerium iodide, indium iodide, and lutetium orthosilicate.

Detection substances and materials are disclosed in U.S. Pat. No. 4,481,421 (Young et al.), U.S. Pat. No. 4,750,081 (Zhang), U.S. Pat. No. 5,973,328 (Hiller et al.), U.S. Pat. No. 6,080,989 (Royle et al.), U.S. Pat. No. 6,011,265 (Sauli), U.S. Pat. No. 6,355,932 (Frederick), U.S. Pat. No. 6,529,573 (Olsher et al.), U.S. Pat. No. 6,654,435 (Kronenberg et al.), U.S. Pat. No. 6,771,730 (Dowben et al.), and U.S. Pat. No. 7,317,195 (Eikman), all incorporated herein by reference.

Luminescent substances are contemplated including BaFBr:$Eu^{2+}$ as disclosed in U.S. Pat. No. 6,998,624 (Katagiri), incorporated herein by reference.

Organic detection substances including polymeric materials may be used. The organic substance may be incorporated into the detector shell or applied as a detector coating on the surface of the detector shell. In one embodiment, there is used π-conjugated polymers and polyaromatic hydrocarbons such as naphthalene, anthracene, rubrene, and quinolates as disclosed in U.S. Pat. No. 7,186,987 (Doty et al.), incorporated herein by reference.

Substrate

In accordance with various embodiments of this invention, the detector shell may be located on a single substrate or within two or more substrates. The substrate may be an article of clothing such as a shirt, jacket, hat, glove, eyeglasses, pants, shoes, and so forth. The substrate may be flexible, semi-flexible, or rigid, with a flat, curved, or irregular surface. The substrate may be opaque, transparent, or translucent. In some embodiments, there may be used multiple substrates of three or more. Substrates may be flexible or bendable films, such as a polymeric film substrate. The substrate may be made of fabric or fibers as discussed above. The flexible substrate may also be made of metallic materials alone or incorporated into a polymeric substrate. Alternatively, or in addition, the substrate may be made of an optically transparent thermoplastic polymeric material. Examples of polymeric materials include polycarbonate, polyvinyl chloride, polystyrene, polymethyl methacrylate, polyurethane polyimide, polyester, and cyclic polyolefin polymers. More broadly, the substrate may include a flexible plastic such as a material selected from the group consisting of polyether sulfone (PES), polyester terephihalate, polyethylene terephihalate (PET), polyethylene naphtholate, polycarbonate, polybutylene terephihalate, polyphenylene sulfide (PPS), polypropylene, polyester, aramid, polyamide-imide (PAI), polyimide, aromatic polyimides, polyetherimide, acrylonitrile butadiene styrene, and polyvinyl chloride, as disclosed in U.S. Patent Application Publication 2004/0179145 (Jacobsen et al.), incorporated herein by reference.

Alternatively, a substrate may be made of a rigid material. For example, a substrate may be glass with a flat, curved, or irregular surface. The glass may be a conventionally available glass, for example, having a thickness of approximately 0.2 to 1 mm. Other suitable materials may be used, such as a rigid plastic or a plastic film. The plastic film may have a high glass transition temperature, for example above 65° C., and may have a transparency greater than 85% at 530 nm.

Each substrate may comprise a single layer or multiple layers of the same or different materials. Substrate composites such as mixtures, dispersions, suspensions, and so forth are also contemplated.

Further details regarding substrates and substrate materials may be found in International Publications Nos. WO 00/46854, WO 00/49421, WO 00/49658, WO 00/55915, and WO 00/55916, the entire disclosures of which are incorporated herein by reference. Apparatus, methods, and compositions for producing flexible substrates are disclosed in U.S. Pat. No. 5,469,020 (Herrick), U.S. Pat. No. 6,274,508 (Jacobsen et al.), U.S. Pat. No. 6,281,038 (Jacobsen et al.), U.S. Pat. No. 6,316,278 (Jacobsen et al.), U.S. Pat. No. 6,468,638 (Jacobsen et al.), U.S. Pat. No. 6,555,408 (Jacobsen et al.), U.S. Pat. No. 6,590,346 (Hadley et al.), U.S. Pat. No. 6,606,247 (Credelle et al.), U.S. Pat. No. 6,665,044 (Jacobsen et al.), and U.S. Pat. No. 6,683,663 (Hadley et al.), all of which are incorporated herein by reference.

The use of gas-filled detector shells on a single substrate that is flexible or bendable allows the encapsulated detector shell to be utilized in a number of applications. In one embodiment, the device is used as a shield to absorb high energy transmissions to protect a person or shielded object especially electronics from the high energy transmission. In this embodiment, a flexible sheet of gas-filled detector shells may be provided as a blanket and shield over the person or object. A flexible sheet of gas-filled detector shells may be rolled up like a rug for transport. The detector device may also be used to detect radiation such as nuclear radiation and/or high energy radiation from a weapon or other source. This is particularly suitable for detecting hidden nuclear devices at airports, airplanes, loading docks, bridges, ships, and other such locations. A rigid substrate may also be used for these embodiments.

Positioning of a Detector Shell on the Substrate

The detector shell may be positioned or located in contact with the substrate by any suitable means. Either a flat side or a domed side may be in contact with the substrate. In one embodiment, the detector shell is bonded or attached to a substrate surface. The shell may be bonded to the substrate surface with a non-conductive adhesive material, which also serves as an insulating barrier to prevent electrically shorting of conductors such as electrodes or antenna connected to a shell.

The shell may be mounted or positioned within a substrate well, cavity, hollow, hole, channel, trench, groove, or like depression or opening. The depression or opening is of suitable dimensions with a mean or average diameter and depth for receiving and retaining the shell. As used herein, depression includes opening, well, cavity, hollow, hole, channel, trench, groove, or any similar opening or depression configuration. In U.S. Pat. No. 4,827,186 (Knauer et al.) incorporated herein by reference, there is shown a cavity referred to as a concavity or saddle. The depression, well or cavity may extend partly through the substrate, embedded within, or extend entirely through the substrate. The cavity may comprise an elongated channel, trench, or groove extending partially or completely across the substrate.

The conductors or electrodes must be in electrical contact with each shell. An air gap between an electrode and the shell will increase operating voltages. A material such as conductive adhesive and/or conductive filler may be used to bridge or connect the electrode to the shell. Such conductive material must be carefully applied so as not to electrically short the electrode to other nearby electrodes. A dielectric material may also be applied to fill any air gap. This dielectric material may also be an adhesive.

Ionizable Gas

The hollow gas-filled detector shell contains one or more ionizable gas components that are ionized and/or discharged by a high energy transmission. In the practice of this invention, the gas may be selected to emit photons in the visible, IR, and/or UV spectrum during ionization and/or gas discharge. The photons may be utilized to excite a luminescent material.

As used herein, gas means one or more gas components. In the practice of this invention, the gas is typically selected from a mixture of the rare gases of neon, argon, xenon, krypton, helium, and/or radon. The rare gas may be a Penning gas mixture. Other contemplated gases include nitrogen, $CO_2$, CO, mercury, halogens, excimers, oxygen, hydrogen, and mixtures thereof. Isotopes of the above and other gases are contemplated. These include isotopes of helium such as helium-3, isotopes of hydrogen such as deuterium (heavy hydrogen), tritium ($T^3$) and DT, isotopes of the rare gases such as xenon-129, and isotopes of oxygen such as oxygen-18. Other isotopes include deuterated gases such as deuterated ammonia ($ND_3$) and deuterated silane ($SiD_4$).

In one embodiment, a two-component gas mixture (or composition) is used such as a mixture of neon and argon, neon and xenon, neon and helium, neon and krypton, argon and xenon, argon and krypton, argon and helium, xenon and krypton, xenon and helium, and krypton and helium. Specific two-component gas mixtures (compositions) include about 5% to 90% atoms of argon with the balance xenon. Another two-component gas mixture is a mother gas of neon containing 0.05% to 15% atoms of xenon, argon, and/or krypton. This can also be a three-component gas, four-component gas, or five-component gas by using quantities of an additional gas or gases selected from xenon, argon, krypton, and/or helium. In another embodiment, a three-component ionizable gas mixture is used such as a mixture of argon, xenon, and neon wherein the mixture contains at least 5% to 80% atoms of argon, up to 15% xenon, and the balance neon. The xenon is present in a minimum amount sufficient to maintain the Penning effect. Such a mixture is disclosed in U.S. Pat. No. 4,926,095 (Shinoda et al.), incorporated herein by reference. Other three-component gas mixtures include argon-helium-xenon, krypton-neon-xenon, and krypton-helium-xenon for example as disclosed in U.S. Pat. No. 5,510,678 (Sakai et al.) and U.S. Pat. No. 5,559,403 (Sakai et al.), both incorporated herein by reference.

U.S. Pat. No. 4,081,712 (Bode et al.), incorporated herein by reference, discloses the addition of helium to a gaseous medium of 90% to 99.99% atoms of neon and 10% to 0.01% atoms of argon, xenon, and/or krypton. In one embodiment, there is used a high concentration of helium with the balance selected from one or more gases of neon, argon, xenon, and nitrogen as disclosed in U.S. Pat. No. 6,285,129 (Park) incorporated herein by reference. Mercury may also be added to the rare gases as disclosed in U.S. Pat. No. 4,041,345 (Sahni), incorporated herein by reference.

A high concentration of xenon may also be used with one or more other gases as disclosed in U.S. Pat. No. 5,770,921 (Aoki et al.), incorporated herein by reference. Pure neon may be used and the shells operated using the architecture disclosed by U.S. Pat. No. 3,958,151 (Yano), discussed above and incorporated herein by reference. In some embodiments, a radioactive gas such as radon may by used alone or in combination with other gases.

Excimers

Excimer gases may also be used as disclosed in U.S. Pat. No. 4,549,109 (Nighan et al.) and U.S. Pat. No. 4,703,229 (Nighan et al.), both incorporated herein by reference. Nighan et al. '109 and '229 disclose the use of excimer gases formed by the combination of halides with inert gases. The halides include fluorine, chlorine, bromine, and iodine. The inert gases include helium, xenon, argon, neon, krypton, and radon. Excimer gases may emit red, blue, green, or other color light in the visible range or light in the invisible range. The excimer gases may be used alone or in combination with phosphors. U.S. Pat. No. 6,628,088 (Kim et al.), incorporated herein by reference, also discloses excimer gases for a PDP.

Other Gases

Depending upon the application, a wide variety of gases are contemplated for the practice of this invention. In addition to displays, other applications include devices for detecting radiation or antenna applications including radar transmissions. Such other gases include $C_2H_2$—$CF_4$—Ar mixtures as disclosed in U.S. Pat. No. 4,201,692 (Christophorou et al.) and U.S. Pat. No. 4,309,307 (Christophorou et al.), both incorporated herein by reference. Also contemplated are gases disclosed in U.S. Pat. No. 4,553,062 (Ballon et al.), incorporated herein by reference. Other gases include sulfur hexafluoride, HF, $H_2S$, $SO_2$, SO, $H_2O_2$, and so forth.

Gas Pressure

In the practice of this invention, the gas pressure inside of a hollow gas-filled detector shell may be equal to or less than atmospheric pressure or may be equal to or greater than atmospheric pressure. In one embodiment, the gas pressure inside of the shell is equal to or less than atmospheric, about 20 to 760 Torr, typically about 150 to about 450 Torr. In one embodiment, the gas pressure inside of the shell is equal to or greater than atmospheric. Depending upon the structural strength of the shell, the pressure above atmospheric may be about 1 to 250 atmospheres (about 760 to 190,000 Torr) or greater. Higher gas pressures increase the luminous efficiency of the plasma display. The gas pressure is selected to allow efficient ionization and/or gas discharge. In one embodiment, the gas pressure is selected to allow the gas to ionize or discharge when a low voltage is applied. In the prior art, gas discharge (plasma) displays are operated with the ionizable gas at pressures below atmospheric. Gas pressures above atmospheric are not used in plasma display prior art because of structural problems. Higher gas pressures above atmospheric may cause the display substrates to separate, especially at elevations of 4000 feet or more above sea level. This problem does not exist with the gas-filled shells of this invention.

Electrodes

One or more electrodes may be connected to each detector shell. In one embodiment, one or more hollow gas-filled detector shells containing the ionizable gas is interconnected to one or more other detector shells. The electrodes may contact the surface of the detector shell or extend through the shell so as to be in direct contact with the ionizable gas inside the shell. In accordance with one embodiment, the contact of the electrode to the shell is augmented with a supplemental electrically conductive bonding substance applied to each shell, to each electrode, and/or to the substrates so as to form an electrically conductive pad connection to the electrodes. A dielectric substance may also be used in lieu of, or in addition to, the conductive substance. Each electrode pad may partially cover an outside surface of the shell. The electrodes and pads may be of any geometric shape or configuration. In one embodiment the electrodes are opposing arrays of electrodes, one array of electrodes being transverse or orthogonal to an opposing array of electrodes. The electrode arrays can be parallel, zig zag, serpentine, or like pattern as typically used in dot-matrix gas discharge (plasma) displays. The use of split or divided electrodes is contemplated as disclosed in U.S. Pat. No. 3,603,836 (Grier) and U.S. Pat. No. 3,701,184 (Grier), incorporated herein by reference. Apertured electrodes may be used as disclosed in U.S. Pat. No. 6,118,214 (Marcotte) and U.S. Pat. No. 5,411,035 (Marcotte) and U.S. Patent Application Publication 2004/0001034 (Marcotte), all incorporated herein by reference.

The electrode array may be divided into two portions and driven from both sides with a so-called dual scan architecture as disclosed by Dr. Thomas J. Pavliscak in U.S. Pat. Nos. 4,233,623 and 4,320,418, both incorporated herein by reference.

A flat shell surface is particularly suitable for connecting electrodes to the shell. If one or more electrodes are connected to the bottom of a shell, a flat bottom surface is desirable. Likewise, if one or more electrodes is connected to the top or sides of the shell, it is advantageous for the connecting surface of such top or sides to be flat.

In a matrix of detector shells, the electrodes in each opposing transverse array are transverse to the electrodes in the opposing array so that each electrode in each array forms a crossover with an electrode in the opposing array, the two arrays thereby forming a multiplicity of crossovers. Each crossover of two opposing electrodes forms a discharge cell. At least one hollow shell containing ionizable gas is positioned at the intersection of at least two opposing electrodes. When an appropriate voltage potential is applied to an opposing pair of electrodes, the ionizable gas inside of the shell at the crossover is energized and a gas discharge occurs. Photons of light in the visible and/or invisible range are emitted by the gas discharge.

Electrode Materials

The electrodes are of any suitable conductive metal or alloy including gold, platinum, silver, aluminum, nickel, copper, chrome, or chrome-copper-chrome. If an electrode transparent to visible light is required on the viewing surface, this is typically indium tin oxide (ITO) or tin oxide with a conductive side or edge bus bar of silver. Other conductive bus bar materials may be used such as gold, aluminum, nickel, or chrome-copper-chrome. For improved electrical contact, the electrodes may partially cover the external surface of the detector shell.

The electrodes may contain a secondary electron emission (Townsend coefficient) material such as a coating for secondary electron emission material such as magnesium oxide. There also may be a protective coating over the electrode, which can be a secondary electron emission material such as magnesium oxide, gadolinium hexaboride or lanthanum hexaboride as disclosed in U.S. Pat. No. 7,145,612 (Sakai et al.), incorporated herein by reference. The rare earth hexaborides are good electron-emitting materials as disclosed in U.S. Pat. No. 5,837,165 (Otani et al.), incorporated herein by reference.

In one embodiment using two electrodes, one electrode such as an anode is composed of lanthanum hexaboride and the other electrode such as a cathode is platinum, for example, as disclosed in U.S. Pat. No. 5,643,692 (Ohmi). In some embodiments, one or more of the conductors or electrodes connected to the shell is composed of or contains a rare earth oxide such as cerium oxide or lanthanum oxide. Also magnesium diboride may be used as a conductor or electrode. In another embodiment, an anode is composed of lanthanum hexaboride and the cathode is platinum, for example, as disclosed in Ohmi '692.

The materials disclosed above for the shell materials and/or secondary electron emission materials may also be suitable, especially the borides for electrode materials. In addition, magnesium tetraboride and titanium boride are contemplated. A shell may experience a short life because of the sputtering of the cathode electrode. Cathode electrode materials with small work functions and low sputter rates result in lower voltage drive and extend the service life of the detector shell. In order to achieve this goal, a cathode electrode with a conductive oxide may be used. Another way to extend detector shell life is through current limiting means such as using a resistor at each detector shell. Increased gas pressure can also extend electrode life.

The electrodes may be applied to the shells and/or supporting substrate by thin film methods such as vapor phase deposition, E-beam evaporation, sputtering, conductive doping, electro-plating, etc. or by thick film methods such as screen printing, ink jet printing, etc.

Antenna Material

The antenna may be made of any conductive metal or alloy as discussed above for electrodes. In addition, the antenna may be made of conductive wire, such as copper, aluminum, silver, or gold, or combinations thereof, such as gold plated copper. Plated wire is particularly cost-effective for high frequencies, because skin effect makes the energy travel on a very thin layer of the surface.

Electrically Conductive Bonding Substance

The antenna or electrodes may be attached to each gas-filled detector element with an electrically conductive bonding substance. This substance may be applied to an exterior surface of the shell, to an antenna and/or electrode, and/or to a substrate surface. In one embodiment, the conductive bonding substance is applied to both the shell and the antenna and/or electrode.

The electrically conductive bonding substance can be any suitable inorganic or organic material including compounds, mixtures, dispersions, pastes, liquids, cements, and adhesives. In one embodiment, the electrically conductive bonding substance is an organic substance with conductive filler material. Contemplated organic substances include adhesive monomers, dimers, trimers, polymers and copolymers of materials such as polyurethanes, polysulfides, silicones, and epoxies. A wide range of other organic or polymeric materials may be used. Contemplated conductive filler materials include conductive metals or metalloids such as silver, gold, platinum, copper, chromium, nickel, aluminum, and carbon. The conductive filler may be of any suitable size and form such as particles, powder, agglomerates, or flakes of any suitable size and shape. It is contemplated that the particles, powder, agglomerates, or flakes may comprise a non-metal, metal, or metalloid core with an outer layer, coating, or film of conductive metal. Some specific embodiments of conductive filler materials include silver-plated copper beads, silver-plated glass beads, silver particles, silver flakes, gold-plated copper beads, gold-plated glass beads, gold particles, gold flakes, and so forth. In one particular embodiment of this invention there is used an epoxy filled with 60% to 80% silver by weight.

Examples of electrically conductive bonding substances are known in the art. The disclosures including the compositions of the following references are incorporated herein by reference. U.S. Pat. No. 3,412,043 (Gilliland) discloses an electrically conductive composition of silver flakes and resinous binder. U.S. Pat. No. 3,983,075 (Marshall et al.) discloses a copper filled electrically conductive epoxy. U.S. Pat. No. 4,247,594 (Shea et al.) discloses an electrically conductive resinous composition of copper flakes in a resinous binder. U.S. Pat. No. 4,552,607 (Frey) and U.S. Pat. No. 4,670,339 (Frey) disclose a method of forming an electrically conductive bond using copper gas-filled detector shells in an epoxy. U.S. Pat. No. 4,880,570 (Sanborn et al.) discloses an electrically conductive epoxy-based adhesive selected from the amine curing modified epoxy family with a filler of silver flakes. U.S. Pat. No. 5,183,593 (Durand et al.) discloses an electrically conductive cement comprising a polymeric carrier such as a mixture of two epoxy resins and filler particles selected from silver agglomerates, particles, flakes, and powders. The filler may be silver-plated particles such as inorganic spheroids. Other noble metals and non-noble metals such as nickel are disclosed. U.S. Pat. No. 5,298,194 (Carter et al.) discloses an electrically conductive adhesive composition comprising a polymer or copolymer of polyolefins or polyesters filled with silver particles. U.S. Pat. No. 5,575,956 (Hermansen et al.) discloses electrically conductive, flexible epoxy adhesives comprising a polymeric mixture of a polyepoxide resin and an epoxy resin filled with conductive metal powder, flakes, or non-metal particles having a metal outer coating. The conductive metal is a noble metal such as gold, silver, or platinum. Silver-plated copper beads and silver-plated glass beads are also disclosed. U.S. Pat. No. 5,891,367 (Basheer et al.) discloses a conductive epoxy adhesive comprising an epoxy resin cured or reacted with selected primary amines and filled with silver flakes. The primary amines provide improved impact resistance. U.S. Pat. No. 5,918,364 (Kulesza et al.) discloses substrate bumps or pads formed of electrically conductive polymers filled with gold or silver. U.S. Pat. No. 6,184,280 (Shibuta) discloses an organic polymer containing hollow carbon microfibers and an electrically conductive metal oxide powder.

In another embodiment, the electrically conductive bonding substance is an organic substance without a conductive filler material. Examples of electrically conductive bonding substances are known in the art. The disclosures including the compositions of the following references are incorporated herein by reference. Electrically conductive polymer compositions are disclosed in U.S. Pat. No. 5,917,693 (Kono et al.), U.S. Pat. No. 6,096,825 (Garnier), and U.S. Pat. No. 6,358,438 (Isozaki et al.). The electrically conductive polymers disclosed above may also be used with conductive fillers. In some embodiments, organic ionic materials such as calcium stearate may be added to increase electrical conductivity as disclosed in U.S. Pat. No. 6,599,446 (Todt et al.), incorporated herein by reference. In one embodiment hereof, the electrically conductive bonding substance is luminescent, for example as disclosed in U.S. Pat. No. 6,558,576 (Brielmann et al.), incorporated herein by reference.

U.S. Pat. No. 5,645,764 (Angelopoulos et al.) discloses electrically conductive pressure sensitive polymers without conductive fillers. Examples of such polymers include electrically conductive substituted and unsubstituted polyanilines, substituted and unsubstituted polyparaphenylenes, substituted and unsubstituted polyparaphenylene vinylenes, substituted and unsubstituted polythiophenes, substituted and unsubstituted polyazines, substituted and unsubstituted polyfuranes, substituted and unsubstituted polypyrroles, substituted and unsubstituted polyselenophenes, substituted and unsubstituted polyphenylene sulfides and substituted and unsubstituted polyacetylenes formed from soluble precursors. Blends of these polymers are suitable for use as are copolymers made from the monomers, dimers, or trimers used to form these polymers.

Photon Exciting of Luminescent Substance

A luminescent substance such as an inorganic and/or organic luminescent phosphor may be located on all or part of the external surface of the shells and/or on all or part of the internal surface of the shells. The phosphor may comprise particles dispersed or floating within the gas. The luminescent material may be incorporated into the shell.

In one embodiment, a layer, coating, or particles of an inorganic and/or organic luminescent substance such as phosphor is located on part or all of the exterior wall surfaces of the shell. The photons of light pass through the shell or wall(s) of the shell and excite the organic or inorganic photoluminescent phosphor located outside of the shell. Typically this is red, blue, or green light. However, phosphors may be used which emit other light such as white, pink, or yellow light. In some embodiments of this invention, the emitted light may not be visible to the human eye. Up-conversion or down-conversion phosphors may be used.

The phosphor may be located on the side wall(s) of a channel, trench, barrier, rib, groove, cavity, well, hollow or like structure that supports the detector shell. In some embodiments, the wall(s) are made of phosphor. The gas discharge in the detector shell within the channel, trench, barrier, groove, cavity, well or hollow produces photons and excites the inorganic and/or organic phosphor such that the phosphor emits light in a range visible to the human eye or invisible light in the UV and/or IR range.

Inorganic and/or organic phosphor may be located on the wall(s) or side(s) of the barriers that form the channel, trench, groove, cavity, well, or hollow as disclosed in U.S. Pat. No. 5,793,158 (Wedding) and U.S. Pat. No. 5,661,500 (Shinoda et al.). Phosphor may also be located on the bottom of the channel, trench or groove as disclosed by Wedding '158 or Shinoda et al. '500 or the bottom cavity, well, or hollow as disclosed by U.S. Pat. No. 4,827,186 (Knauer et al.). The detector shells are positioned within or along the walls of a channel, barrier, trench, groove, cavity, well or hollow so as to be in close proximity to the phosphor such that photons from the gas discharge within the shell cause the phosphor along the wall(s), side(s) or at the bottom of the channel, barrier, trenches groove, cavity, well, or hollow, to emit light in the visible and/or invisible range.

In another embodiment, phosphor is located on the outside surface of each shell. In this embodiment, the outside surface is at least partially covered with phosphor that emits light in the visible or invisible range when excited by photons from the gas discharge within the shell. The phosphor may emit light in the visible, UV, and/or IR range.

In one embodiment, phosphor is dispersed and/or suspended within the ionizable gas inside each shell. In such embodiment, the phosphor particles are sufficiently small such that most of the phosphor particles remain suspended within the gas and do not precipitate or otherwise substantially collect on the inside wall of the shell. The average diameter of the dispersed and/or suspended phosphor particles is less than about 1 micron, typically less than 0.1 micron. Larger particles can be used depending on the size of the shell. The phosphor particles may be introduced by means of a fluidized bed.

The inorganic and/or organic luminescent substance is located on the external surface and is excited by photons from the gas discharge inside the shell. The phosphor emits light in the visible range such as red, blue, or green light. Phosphors may be selected to emit light of other colors such as white, pink, or yellow. The phosphor may also be selected to emit light in non-visible ranges of the spectrum. Optical filters may be selected and matched with different phosphors.

The phosphor thickness is sufficient to absorb the UV, but thin enough to emit light with minimum attenuation. Typically the phosphor thickness is about 2 to 40 microns, preferably about 5 to 15 microns. In one embodiment, dispersed or floating particles within the gas are typically spherical or needle shaped having an average size of about 0.01 to 5 microns.

A UV photoluminescent phosphor is excited by UV in the range of 50 to 400 nanometers. The phosphor may have a protective layer or coating which is transmissive to the excitation UV and the emitted visible light. Such include organic films such as perylene or inorganic films such as aluminum oxide or silica. Protective overcoats are disclosed and discussed below. Because the ionizable gas is contained within a multiplicity of shells, it is possible to provide a custom gas mixture or composition at a custom pressure in each shell for each phosphor. In the prior art, it is necessary to select an ionizable gas mixture and a gas pressure that is optimum for all phosphors used in the device such as red, blue, and green phosphors. However, this requires trade-offs because a particular gas mixture may be optimum for a particular green phosphor, but less desirable for red or blue phosphors. In addition, trade-offs are required for the gas pressure. In the practice of this invention, an optimum gas mixture and an optimum gas pressure may be provided for each of the selected phosphors. Thus the gas mixture and gas pressure inside the shells may be optimized with a custom gas mixture and a custom gas pressure, each or both optimized for each phosphor emitting red, blue, green, white, pink, or yellow light in the visible range or light in the invisible range. The diameter and the wall thickness of the shell can also be adjusted and optimized for each phosphor. Depending upon the Paschen Curve (pd v. voltage) for the particular ionizable gas mixture, the operating voltage may be decreased by optimized changes in the gas mixture, gas pressure, and the dimensions of the shell including the distance between electrodes.

Organic Luminescent Substances

Organic luminescent substances may be used alone or in combination with inorganic luminescent substances. Contemplated combinations include mixtures and/or selective layers of organic and inorganic substances. In accordance with one embodiment, an organic luminescent substance is located in close proximity to the enclosed gas discharge within a shell, so as to be excited by photons from the enclosed gas discharge and/or gas ionization.

In one preferred embodiment, an organic photoluminescent substance is positioned on at least a portion of the external surface of a shell, so as to be excited by photons from the gas discharge within the shell, such that the excited photoluminescent substance emits visible and/or invisible light.

As used herein organic luminescent substance comprises one or more organic compounds, monomers, dimers, trimers, polymers, copolymers, or like organic materials, which emit visible and/or invisible light when excited by photons from the gas discharge inside of the shell. Such organic luminescent substances may include one or more organic photoluminescent phosphors selected from organic photoluminescent compounds, organic photoluminescent monomers, dimers, trimers, polymers, copolymers, organic photoluminescent dyes, organic photoluminescent dopants and/or any other organic photoluminescent material. All are collectively referred to herein as organic photoluminescent phosphor.

Organic photoluminescent phosphor substances contemplated herein include those organic light-emitting diodes or devices (OLED) and organic electroluminescent (organic EL) materials, which emit light when excited by photons from the gas discharge of a gas plasma discharge. OLED and organic EL substances include the small molecule organic EL and the large molecule or polymeric OLED.

Small molecule organic EL substances are disclosed in U.S. Pat. No. 4,720,432 (VanSlyke et al.), U.S. Pat. No. 4,769,292 (Tang et al.), U.S. Pat. No. 5,151,629 (VanSlyke), U.S. Pat. No. 5,409,783 (Tang et al.), U.S. Pat. No. 5,645,948 (Shi et al.), U.S. Pat. No. 5,683,823 (Shi et al.), U.S. Pat. No. 5,755,999 (Shi et al.), U.S. Pat. No. 5,908,581 (Chen at al), U.S. Pat. No. 5,935,720 (Chen et al.), U.S. Pat. No. 6,020,078 (Chen et al.), U.S. Pat. No. 6,069,442 (Hung et al.), U.S. Pat. No. 6,348,359 (VanSlyke et al.), and U.S. Pat. No. 6,720,090 (Young et al.), all incorporated herein by reference. The small molecule organic light-emitting devices may be called SMOLED.

Large molecule or polymeric OLED substances are disclosed in U.S. Pat. No. 5,247,190 (Friend et al.), U.S. Pat. No. 5,399,502 (Friend et al.), U.S. Pat. No. 5,540,999 (Yamamoto et al.), U.S. Pat. No. 5,900,327 (Pei et al.), U.S. Pat. No. 5,804,836 (Heeger et al.), U.S. Pat. No. 5,807,627 (Friend et al.), U.S. Pat. No. 6,361,885 (Chou), and U.S. Pat. No. 6,670,645 (Grushin et al.), all incorporated herein by reference. The polymer light-emitting devices may be called PLED. Organic luminescent substances also include OLEDs doped with phosphorescent compounds as disclosed in U.S. Pat. No. 6,303,238 (Thompson et al.), incorporated herein by reference. Organic photoluminescent substances are also disclosed in U.S. Patent Application Publications 2002/0101151 (Choi et al.), 2002/0063525 (Choi et al.), 2003/0003225 (Choi et al.), and 2003/0052596 (Yi et al.), U.S. Pat. No. 6,610,554 (Yi et al.), U.S. Pat. No. 6,692,326 (Choi et al.), and International Publications WO 02/104077 and WO 03/046649, all incorporated herein by reference.

In one embodiment, the organic luminescent phosphorous substance is a color-conversion-media (CCM) that converts light (photons) emitted by the gas discharge to visible or invisible light. Examples of CCM substances include the fluorescent organic dye compounds.

In another embodiment, the organic luminescent substance is selected from a condensed or fused ring system such as a perylene compound, a perylene based compound, a perylene derivative, a perylene based monomer, dimer or trimer, a perylene based polymer, and/or a substance doped with a perylene.

Photoluminescent perylene phosphor substances are widely known in the prior art. U.S. Pat. No. 4,968,571 (Gruenbaum et al.), incorporated herein by reference, discloses photoconductive perylene materials, which may be used as photoluminescent phosphorous substances. U.S. Pat. No. 5,693,808 (Langhals), incorporated herein by reference, discloses the preparation of luminescent perylene dyes. U.S. Patent Application Publication 2004/0009367 (Hatwar), incorporated herein by reference, discloses the preparation of luminescent materials doped with fluorescent perylene dyes. U.S. Pat. No. 6,528,188 (Suzuki et al.), incorporated herein by reference, discloses the preparation and use of luminescent perylene compounds.

These condensed or fused ring compounds are conjugated with multiple double bonds and include monomers, dimers, trimers, polymers, and copolymers. In addition, conjugated aromatic and aliphatic organic compounds are contemplated including monomers, dimers, trimers, polymers, and copolymers. Conjugation as used herein also includes extended conjugation. A material with conjugation or extended conjugation absorbs light and then transmits the light to the various conjugated bonds. Typically the number of conjugate-double bonds ranges from about 4 to about 15. Further examples of conjugate-bonded or condensed/fused benzene rings are disclosed in U.S. Pat. No. 6,614,175 (Aziz et al.) and U.S. Pat. No. 6,479,172 (Hu et al.), both incorporated herein by reference. U.S. Patent Application Publication 2004/0023010 (Bulovic et al.) incorporated herein by reference, discloses luminescent nanocrystals with organic polymers including conjugated organic polymers. Cumulene is conjugated only with carbon and hydrogen atoms. Cumulene becomes more deeply colored as the conjugation is extended. Other condensed or fused ring luminescent compounds may also be used including naphthalimides, substituted naphthalimides, naphthalimide monomers, dimers, trimers, polymers, copolymers and derivatives thereof including naphthalimide diester dyes such as disclosed in U.S. Pat. No. 6,348,890 (Likavec et al.), incorporated herein by reference.

The organic luminescent substance may be an organic lumophore or luminophore, for example as disclosed in U.S. Pat. No. 5,354,825 (Klainer et al.), U.S. Pat. No. 5,480,723 (Klainer et al.), U.S. Pat. No. 5,700,897 (Klainer et al.), U.S. Pat. No. 6,538,263 (Park et al.), and U.S. Pat. No. 7,064,731 (Doyen et al.), all incorporated herein by reference. Also lumophores are disclosed in S. E. Shaheen et al., *Journal of Applied Physics*, Vol. 84, Number 4, pages 2324 to 2327, Aug. 15, 1998; J. D. Anderson et al., *Journal American Chemical Society*, 1998, Vol. 120, pages 9646 to 9655; and Gyu Hyun Lee et al., *Bulletin of Korean Chemical Society*, 2002, Vol. 23, NO. 3, pages 528 to 530, all incorporated herein by reference.

Application of Organic Phosphors

Organic phosphors may be added to a UV curable medium and applied to the shell with a variety of methods including jetting, spraying, brushing, sheet transfer methods, spin coating, dip coating, or screen-printing. Thin film deposition processes are contemplated including vapor phase deposition and thin film sputtering at temperatures that do not degrade the organic material. This may be done before or after the shell is added to a substrate or back plate.

Application of Phosphor Before Shells are Added to Substrate

If organic phosphors are applied to the shells before such are applied to the substrate, additional steps may be necessary to place each shell in the correct position on the substrate.

Application of Phosphor after Shells are Added to Substrate

If the organic phosphor is applied to the shells after such are placed on a substrate, care must be taken to align the appropriate phosphor color with the appropriate shell.

Application of Phosphor after Shells are Added to Substrate-Self Aligning

In one embodiment, the shells may be used to cure the phosphor. A single color organic phosphor is completely applied to the entire substrate containing the shells. Next the shells are selectively activated to produce UV to cure the organic phosphor. The phosphor will cure on the shells that are activated and may be rinsed away from the shells that were not activated. Additional applications of phosphor of different colors may be applied using this method to coat the remaining shells. In this way the process is completely self-aligning.

Inorganic Luminescent Substances

Inorganic luminescent substances may be used alone or in combination with organic luminescent substances. Contemplated combinations include mixtures and/or selective layers of organic and/or inorganic substances. The shell may be made of an inorganic luminescent substance such as a phosphor. Inorganic luminophores or lumophores may also be used. In one embodiment the inorganic luminescent substance is incorporated into the particles forming the shell structure. Typical inorganic luminescent substances are listed below.

Green Phosphor

A green light-emitting phosphor may be used alone or in combination with other light-emitting phosphors such as blue or red. Phosphor materials which emit green light include $Zn_2SiO_4$:Mn, ZnS:Cu, ZnS:Au, ZnS:Al, ZnO:Zn, CdS:Cu, CdS:$Al_2$, $Cd_2O_2S$:Tb, and $Y_2O_2S$:Tb. In one mode and embodiment, there is used a green light-emitting phosphor selected from the zinc orthosilicate phosphors such as $ZnSiO_4$:$Mn^{2+}$. Green light-emitting zinc orthosilicates including the method of preparation are disclosed in U.S. Pat. No. 5,985,176 (Rao), which is incorporated herein by reference. These phosphors have a broad emission in the green region when excited by 147 nm and 173 nm (nanometer) radiation from the discharge of a xenon gas mixture. In another mode and embodiment of this invention, there is used a green light-emitting phosphor which is a terbium activated yttrium gadolinium borate phosphor such as (Gd, Y) $BO_3$:$Tb^{3+}$. Green light-emitting borate phosphors including the method of preparation are disclosed in U.S. Pat. No. 6,004,481 (Rao), which is incorporated herein by reference. In another mode and embodiment there is used a manganese activated alkaline earth aluminate green phosphor as disclosed in U.S. Pat. No. 6,423,248 (Rao), peaking at 516 nm when excited by 147 nm and 173 nm radiation from xenon. The particle size ranges from 0.05 to 5 microns. Rao '248 is incorporated herein by reference. Terbium doped phosphors may emit in the blue region especially in lower concentrations of terbium. By incorporating a blue absorption dye in a filter, a blue peak may be eliminated. Green light-emitting terbium-activated lanthanum cerium orthophosphate phosphors are disclosed in U.S. Pat. No. 4,423,349 (Nakajima et al.), which is incorporated herein by reference. Green light-emitting lanthanum cerium terbium phosphate phosphors are disclosed in U.S. Pat. No. 5,651,920 (Chau et al.), incorporated herein by reference. Green light-emitting phosphors may also be selected from the trivalent rare earth ion-containing aluminate phosphors as disclosed in U.S. Pat. No. 6,290,875 (Oshio et al.).

Blue Phosphor

A blue light-emitting phosphor may be used alone or in combination with other light-emitting phosphors such as green or red. Phosphor materials which emit blue light include ZnS:Ag, ZnS:Cl, and CsI:Na. In one embodiment, there is used a blue light-emitting aluminate phosphor. An aluminate phosphor which emits blue visible light is divalent europium ($Eu^{2+}$) activated Barium Magnesium Aluminate (BAM) represented by $BaMgAl_{10}O_{17}$:$Eu^{2+}$. BAM is widely used as a blue phosphor in the PDP industry.

BAM and other aluminate phosphors, which emit blue visible light, are disclosed in U.S. Pat. No. 5,611,959 (Kijima et al.) and U.S. Pat. No. 5,998,047 (Bechtel et al.), incorporated herein by reference. The aluminate phosphors may also be selectively coated as disclosed by Bechtel et al. '047. Blue light-emitting phosphors may be selected from a number of divalent europium-activated aluminates such as disclosed in U.S. Pat. No. 6,096,243 (Oshio et al.), incorporated herein by reference. The preparation of BAM phosphors is also disclosed in U.S. Pat. No. 6,045,721 (Zachau et al.), incorporated herein by reference.

In another mode and embodiment of this invention, the blue light-emitting phosphor is thulium activated lanthanum phosphate with trace amounts of $Sr^{2+}$ and/or $Li^{+}$. This exhibits a narrow band emission in the blue region peaking at 453 nm when excited by 147 nm and 173 nm radiation from the discharge of a xenon gas mixture. Blue light-emitting phosphate phosphors including the method of preparation are disclosed in U.S. Pat. No. 5,989,454 (Rao), which is incorporated herein by reference.

In one embodiment, using a blue light-emitting phosphor, a mixture or blend of blue light-emitting phosphors is used such as a blend or complex of about 70% to 85% by weight of a lanthanum phosphate phosphor activated by trivalent thulium ($Tm^{3+}$), $Li^{+}$, and an optional amount of an alkaline earth element ($AE^{2+}$) as a coactivator and about 15% to 30% by weight of divalent europium-activated BAM phosphor or divalent europium-activated Barium Magnesium, Lanthanum Aluminated (BLAMA) phosphor. Such a mixture is disclosed in U.S. Pat. No. 6,187,225 (Rao), incorporated herein by reference. A blue BAM phosphor with partially substituted $Eu^{2+}$ is disclosed in U.S. Pat. No. 6,833,672 (Aoki et al.) and is also incorporated herein by reference.

Blue light-emitting phosphors also include $ZnO.Ga_2O_3$ doped with Na or Bi. The preparation of these phosphors is disclosed in U.S. Pat. No. 6,217,795 (Yu et al.) and U.S. Pat. No. 6,322,725 (Yu et al.), both incorporated herein by reference. Other blue light-emitting phosphors include europium-activated strontium chloroapatite and europium-activated strontium calcium chloroapatite.

Red Phosphor

A red light-emitting phosphor may be used alone or in combination with other light-emitting phosphors such as green or blue. Phosphor materials which emit red light include $Y_2O_2S$:Eu and $Y_2O_3S$:Eu. In one mode and embodiment, there is used a red light-emitting phosphor which is an europium activated yttrium gadolinium borate phosphors such as $(Y,Gd)BO_3:Eu^{3+}$. The composition and preparation of these red light-emitting borate phosphors is disclosed in U.S. Pat. No. 6,042,747 (Rao) and U.S. Pat. No. 6,284,155 (Rao), both incorporated herein by reference. These europium activated yttrium, gadolinium borate phosphors emit an orange line at 593 nm and red emission lines at 611 nm and 627 nm when excited by 147 nm and 173 nm UV radiation from the discharge of a xenon gas mixture. The orange line (593 nm) may be minimized or eliminated with an external optical filter. A wide range of red light-emitting phosphors are contemplated including europium-activated yttrium oxide.

Other Phosphors

There also may be used phosphors other than red, blue, green such as a white light-emitting phosphor, pink light-emitting phosphor or yellow light-emitting phosphor. These may be used with an optical filter. Phosphor materials which emit white light include calcium compounds such as $3Ca_3(PO_4)_2$.CaF:Sb, $3Ca_3(PO_4)_2$.CaF:Mn, $3Ca_3(PO_4)_2$.CaCl:Sb, and $3Ca_3(PO_4)_2$.CaCl:Mn. White light-emitting phosphors are disclosed in U.S. Pat. No. 6,200,496 (Park et al.), incorporated herein by reference. Pink light-emitting phosphors are disclosed in U.S. Pat. No. 6,200,497 (Park et al.), incorporated herein by reference. Phosphor material which emits yellow light includes ZnS:Au.

Organic and Inorganic Luminescent Materials

Inorganic and organic luminescent materials may be used in selected combinations. In one embodiment, multiple layers of luminescent materials are applied to the detector shell with at least one layer being organic and at least one layer being inorganic. An inorganic layer may serve as a protective overcoat for an organic layer.

In another embodiment, the shell comprises or contains inorganic luminescent material. In another embodiment, organic and inorganic luminescent materials are mixed together and applied as a layer inside or outside the shell. The shell may also be made of or contain a mixture of organic and inorganic luminescent materials. In one preferred embodiment, a mixture of organic and inorganic material is applied outside the shell.

Up-Conversion

In one embodiment, an inorganic and/or organic luminescent substance such as a phosphor is used for up-conversion, for example to convert infrared radiation to visible light. Up-conversion materials include phosphors and are disclosed in U.S. Pat. No. 3,623,907 (Watts), U.S. Pat. No. 3,634,614 (Geusic), U.S. Pat. No. 5,541,012 (Ohwaki et al.), U.S. Pat. No. 6,265,825 (Asano), and U.S. Pat. No. 6,624,414 (Glesener), all incorporated herein by reference. Up-conversion may also be obtained with shell compositions such as thulium doped silicate glass containing oxides of Si, Al, and La, as disclosed in U.S. Patent Application Publication 2004/0037538 (Schardt et al.), incorporated herein by reference. The glasses of Schardt et al. emit visible or UV light when excited by IR. Glasses for up-conversion are also disclosed in Japanese Patent Publications 9054562 and 9086958 (Akira et al.), both incorporated herein by reference.

U.S. Pat. No. 5,166,948 (Gavrilovic), incorporated herein by reference, discloses an up-conversion crystalline structure. U.S. Pat. No. 6,726,992 (Yadav et al.), incorporated herein by reference, discloses nano-engineered luminescent materials including both Stokes and Anti-Stokes phosphors. It is contemplated that the shell may be constructed wholly or in part from an up-conversion material, down-conversion material or a combination of both.

Down-Conversion

The luminescent material may also include down-conversion materials such as phosphors as disclosed in U.S. Pat. No. 3,838,307 (Masi), incorporated herein by reference. Down-conversion luminescent materials are also disclosed in U.S. Pat. No. 6,013,538 (Burrows et al.), U.S. Pat. No. 6,091,195 (Forrest et al.), U.S. Pat. No. 6,208,791 (Bischel et al.), U.S. Pat. No. 6,566,156 (Sturm et al.), and U.S. Pat. No. 6,650,045 (Forrest et al.), incorporated herein by reference. Down-conversion luminescent materials are also disclosed in U.S. Patent Application Publication Nos. 2004/0159903 (Burgener, II et al.), 2004/0196538 (Burgener, II et al.), 2005/0093001 (Liu et al.), and 2005/0094109 (Sun et al.), incorporated herein by reference. Phosphors are also disclosed in European Patent Publication 0143034 (Maestro et al.), incorporated herein by reference. As noted above, the shell may be constructed wholly or in part from a down-conversion material, up-conversion material or a combination of both.

Application of Luminescent Materials

The organic and/or inorganic luminescent substance may be applied by any suitable method to the external surface of the shell, to the substrate or to any location in close proximity to the gas discharge contained within the shell. Such methods include thin film deposition methods such as vapor phase deposition, sputtering and E-beam evaporation. Also thick film application methods may be used such as screen-printing, ink jet printing, and/or slurry techniques. Small size molecule OLED materials are typically deposited upon the external surface of the shell by thin film deposition methods such as vapor phase deposition or sputtering. Large size molecule or polymeric OLED materials are deposited by so called thick film application methods such as screen-printing, ink jet, and/or slurry techniques. If the organic and/or inorganic luminescent substance is applied to the external surface of the shell, such may be applied as a continuous or discontinuous layer or coating so as to completely or partially cover the shell with the luminescent substance. A spraying method for depositing phosphors is disclosed in U.S. Pat. No. 5,876,542 (Fujiwara). The luminescent material may also be incorporated into the shell material and/or added to the inside of the shell during shell formation or after the shell is formed.

Quantum Dots

In one embodiment of this invention, the luminescent substance is a quantum dot material. Examples of luminescent quantum dots are disclosed in International Publication Nos. WO 03/038011, WO 00/029617, WO 03/038011, WO 03/100833, and WO 03/037788, all incorporated herein by reference. Luminescent quantum dots are also disclosed in U.S. Pat. No. 6,468,808 (Nie et al.), U.S. Pat. No. 6,501,091 (Bawendi et al.), U.S. Pat. No. 6,698,313 (Park et al.), and U.S. Patent Application Publication 2003/0042850 (Bertram et al.), all incorporated herein by reference. The quantum dots may be added or incorporated into the shell during shell formation or after the shell is formed.

Protective Overcoat for Luminescent Substance

In one embodiment, an organic and/or inorganic luminescent substance is located on an external surface of the shell and/or at an external location such as on the substrate near the shell. Organic luminescent phosphors are particularly suitable for placing on the exterior shell surface, but may require a protective overcoat. The protective overcoat may be inorganic, organic, or a combination of inorganic and organic. This protective overcoat may be an inorganic and/or organic luminescent material.

The luminescent substance may have a protective overcoat such as a clear or transparent acrylic compound including acrylic solvents, monomers, dimers, trimers, polymers, copolymers, and derivatives thereof to protect the luminescent substance from direct or indirect contact or exposure with environmental conditions such as air, moisture, sunlight, handling, or abuse. The selected acrylic compound is of a viscosity such that it can be conveniently applied by spraying, screen print, ink jet, or other convenient methods so as to form a clear film or coating of the acrylic compound over the luminescent substance.

Other organic compounds may also be suitable as protective overcoats including silanes such as glass resins. Also the polyesters such as Mylar® may be applied as a spray or a sheet fused under vacuum to make it wrinkle free. Polycarbonates may be used but may be subject to UV absorption and detachment.

In one embodiment hereof the luminescent substance is coated with a film or layer of a parylene compound including monomers, dimers, trimers, polymers, copolymers, and derivatives thereof. The parylene compounds are widely used as protective films. Specific compounds including poly-monochloro-para-xylyene (Parylene C) and poly-para-xylylene (Parylene N). Parylene polymer films are also disclosed in U.S. Pat. No. 5,879,808 (Wary et al.) and U.S. Pat. No. 6,586,048 (Welch et al.), both incorporated herein by reference. The parylene compounds may be applied by ink jet printing, screen printing, spraying, and so forth as disclosed in U.S. Patent Application Publication 2004/0032466 (Deguchi et al.), incorporated herein by reference. Parylene conformal coatings are covered by Mil-I-46058C and ISO 9002. Parylene films may also be induced into fluorescence by an active plasma as disclosed in U.S. Pat. No. 5,139,813 (Yira et al.), incorporated herein by reference.

Phosphor overcoats are also disclosed in U.S. Pat. No. 4,048,533 (Hinson et al.), U.S. Pat. No. 4,315,192 (Skwirut et al.), U.S. Pat. No. 5,592,052 (Maya et al.), U.S. Pat. No. 5,604,396 (Watanabe et al.), U.S. Pat. No. 5,793,158 (Wedding), and U.S. Pat. No. 6,099,753 (Yoshimura et al.), all incorporated herein by reference. In some embodiments, the luminescent substance is selected from materials that do not degrade when exposed to oxygen, moisture, sunlight, etc. and that may not require a protective overcoat. Such include various organic luminescent substances such as the luminescent perylene compounds disclosed above. For example, luminescent perylene compounds may be used and do not require a protective overcoat.

Detector Shells Combined with Detector Tubes

The detecting structure may comprise a combination of gas-filled detector shells and gas-filled elongated detector tubes. Antenna and/or electrodes may be attached to the elongated tubes. Gas-filled elongated tubes are disclosed in U.S. Pat. No. 3,602,754 (Pfaender et al.), U.S. Pat. No. 3,654,680 (Bode et al.), U.S. Pat. No. 3,927,342 (Bode et al.), U.S. Pat. No. 4,038,577 (Bode et al.), U.S. Pat. No. 3,969,718 (Strom), U.S. Pat. No. 3,990,068 (Mayer et al.), U.S. Pat. No. 4,027,188 (Bergman), U.S. Pat. No. 5,984,747 (Bhagavatula et al.), U.S. Pat. No. 6,255,777 (Kim et al.), U.S. Pat. No. 6,633,117 (Shinoda et al.), U.S. Pat. No. 6,650,055 (Ishimoto et al.), and U.S. Pat. No. 6,677,704 (Ishimoto et al.), all incorporated herein by reference.

As used herein, the elongated gas-filled detector tube is intended to include capillary, filament, filamentary, illuminator, hollow rod, or other such terms. It includes an elongated enclosed gas-filled structure having a length dimension that is greater than its width dimension. The width of the gas-filled detector tube is the viewing width from the top or bottom. A gas-filled detector tube has multiple gas discharge cells or pixels of 100 or more, typically 500 to 1000 or more, whereas a gas-filled detector shell typically has only one gas discharge cell. In some embodiments, the gas-filled detector shell may define more than one cell, i.e., 2, 3, or 4 cells up to 10 cells.

The length of each gas-filled detector tube may vary depending upon the length of the structure. In one embodiment hereof, an elongated tube is selectively divided into a multiplicity of lengths. In another embodiment, there is used a continuous tube that winds or weaves back and forth from one end to the other end of the detector.

The gas-filled detector shells and/or gas-filled detector tubes may be arranged in any configuration. In one embodiment, there are alternating rows of gas-filled detector shells and gas-filled detector tubes. The gas-filled detector tubes may be used for any desired function or purpose including the priming or conditioning of the gas-filled detector shells. In one embodiment, the tubes are arranged around the perimeter of the detector to provide priming or conditioning of the gas in the detector shells. The tubes may be of any geometric cross-section including circular, elliptical, square, rectangular, triangular, polygonal, trapezoidal, pentagonal, or hexagonal. The tube may contain secondary electron emission materials, luminescent materials, and reflective materials as discussed herein for shells. The gas-filled detector tubes and/or the shells may be positioned and spaced in a structure so as to utilize positive column discharge. Elongated gas-filled tubes with positive column discharge is disclosed in U.S. Pat. Nos. 7,176,628, 7,157,854 and 7,122,961, all issued to Carol Ann Wedding and incorporated herein by reference.

Combinations of Shells

The energy detector may comprise shells having different geometric shapes, shells made of different materials, and/or shells filled with different gases, to detect different high energy transmissions.

Combinations of shells with different geometric shapes include spheres and discs, spheres and domes, discs and domes, spheres, discs, and domes, cubes and cuboids, discs and cubes, and discs and cuboids. The shell material may vary from shell to shell including from geometric shape to geometric shape. Shells of the same or different geometric shape may be filled with different gases.

The geometric shape of the shells, shell material, and gas may vary from shell to shell within a given detector device. Thus one shell in a detector device of a selected geometric shape may be made of one material and contain one gas while another shell of the same or different geometric shape may be made of the same or a different material and/or contain the same or a different gas.

Shells may also be positioned or located closely together for more effective detection. The shells may be stacked in two or more layers. The shells may also be located on opposite sides of the same substrate.

SUMMARY

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims to be interpreted in accordance with the breadth to which they are fairly, legally, and equitably entitled.

The invention claimed is:

1. A high energy detector device comprising a detector element with two or more antenna attached to the element to receive high energy transmissions, each antenna being resonant over a different frequency range, wherein the detector element is a gas-filled detector shell.

2. The invention of claim 1 wherein the gas-filled detector shell is located on a substrate.

3. The invention of claim 2 wherein the substrate is rigid, flexible, or semi-flexible.

4. The invention of claim 1 wherein the geometric shape of the gas-filled detector shell is a sphere, disc, dome, cube, or cuboid.

5. The invention of claim 1 wherein the hollow gas-filled detector shell is connected to electronic circuitry.

6. The invention of claim 5 wherein the gas-filled detector shell is electrically driven at a voltage threshold just below the gas discharge voltage so as to increase the sensitivity of the detector shell to the high energy transmissions.

7. A method for detecting high energy transmission with a device comprising a multiplicity of cells, each cell being defined by a gas-filled detector shell positioned on a substrate, each shell being filled with an ionizable gas that is ionized or discharged when subjected to microwaves or other high energy transmissions, each gas-filled shell being connected to one or more antenna to enhance reception of the high energy transmission, selected antenna being of different length so as to be resonant over different frequency ranges.

8. The invention of claim 7 wherein at least one gas-filled elongated detector tube is used in combination with the gas-filled detector shells.

9. The invention of claim 7 wherein each hollow gas-filled detector shell is connected to an array of electrodes attached to electronic drive circuitry.

10. The invention of claim 9 wherein each gas-filled detector shell is electrically driven to a threshold just below ionization by the electrodes and electronic drive circuitry such that each gas-filled detector shell has increased sensitivity to the high energy transmission.

11. The invention of claim 7 wherein the device comprises detector shells of different geometric shape.

12. The invention of claim 11 wherein the geometric shape of each detector shell is a sphere, a disc, a dome, a cube, or a cuboid.

13. As an article of manufacture, a hollow detector shell filled with gas capable of being ionized or discharged when subjected to microwaves or other high energy transmissions, said shell being attached to two or more antenna to enhance the sensitivity of the gas to high energy transmissions, at least two antennae being of a different length so as to be resonant over a different frequency range.

14. The invention of claim 13 wherein the geometric shape of each gas-filled detector shell is a sphere, a disc, a dome, a cube, or a cuboid.

15. The invention of claim 13 wherein the gas-filled detector shell is located on a substrate.

16. The invention of claim 15 wherein the substrate is an article of clothing.

17. The invention of claim 16 wherein the article of clothing is a glove or hat.

18. The invention of claim 13 wherein the gas-filled detector shell is connected to electronic circuitry.

19. The invention of claim 18 wherein the gas-filled detector shell is electrically driven to a threshold just below ionization by the electronic circuitry such that the gas-filled detector shell has increased sensitivity to the high energy transmission.

* * * * *